US006676820B2

(12) United States Patent
Emmonds et al.

(10) Patent No.: US 6,676,820 B2
(45) Date of Patent: Jan. 13, 2004

(54) PROCESS FOR ELECTROCOATING METAL BLANKS AND COILED METAL SUBSTRATES

(75) Inventors: Donald D. Emmonds, Ford City, PA (US); Catharine A. Palmer, Zelienople, PA (US); Linda K. Anderson, Pittsburgh, PA (US); Robin M. Peffer, Valencia, PA (US); Donald W. Boyd, Cheswick, PA (US); Paul R. Kerr, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 118 days.

(21) Appl. No.: 09/798,627

(22) Filed: Mar. 2, 2001

(65) Prior Publication Data

US 2002/0168551 A1 Nov. 14, 2002

(51) Int. Cl.$^7$ ............................................. C25D 13/12
(52) U.S. Cl. ....................... 204/486; 204/488; 204/512
(58) Field of Search ................................ 204/488, 512, 204/486

(56) References Cited

U.S. PATENT DOCUMENTS 3,455,806 A 7/1969 Spoor et al. ............... 204/181
3,539,489 A 11/1970 Ness .......................... 204/623

(List continued on next page.)

FOREIGN PATENT DOCUMENTS

DE 27 07 405 1/1978

OTHER PUBLICATIONS

"Alcoa Experimental Coil Finishing"; Aluminum Company of America Product Literature.

*Primary Examiner*—Kishor Mayekar
(74) *Attorney, Agent, or Firm*—Deborah M. Altman

(57) ABSTRACT

Processes for forming a coating on electroconductive flat blanks having two major surfaces and sheared edges are provided. Also provided is a process for forming a multi-composite coating on a pre-sheared, electroconductive, flat blank having two major surfaces and sheared edges. Methods for forming and coating metal blanks are also provided. The present invention further provides a pre-sheared, flat electroconductive blank having two major surfaces and coated with a multi-layer composite coating composition on one major surface. The present invention also provides a method for coating a continuous metal strip, optionally, thereafter forming a coated blank therefrom, and, optionally, applying a second coating to the blank.

24 Claims, 3 Drawing Sheets

U.S. PATENT DOCUMENTS

| | | | |
|---|---|---|---|
| 3,640,814 A | 2/1972 | Ness | 204/623 |
| 3,663,389 A | 5/1972 | Koral et al. | 204/181 |
| 3,749,657 A | 7/1973 | Le Bras et al. | 204/181 |
| 3,793,278 A | 2/1974 | De Bona | 260/29.2 EP |
| 3,887,720 A | 6/1975 | Jackson | 427/32 |
| 3,928,157 A | 12/1975 | Suematsu et al. | 204/181 |
| 3,947,338 A | 3/1976 | Jerabek et al. | 204/181 |
| 3,947,339 A | 3/1976 | Jerabek et al. | 204/181 |
| 3,962,060 A | 6/1976 | Brasko et al. | 204/181 |
| 3,962,165 A | 6/1976 | Bosso et al. | 260/29.2 EP |
| 3,975,346 A | 8/1976 | Bosso et al. | 260/29.2 EP |
| 3,984,299 A | 10/1976 | Jerabek | 204/181 |
| 3,984,922 A | 10/1976 | Rosen | 35/4 |
| 4,001,101 A | 1/1977 | Bosso et al. | 204/181 |
| 4,104,416 A | 8/1978 | Parthasarathy et al. | 427/29 |
| 4,116,900 A | 9/1978 | Belanger | 260/18 EP |
| 4,134,866 A | 1/1979 | Tominaga et al. | 260/18 PN |
| 4,134,932 A | 1/1979 | Kempter et al. | 260/831 |
| 4,259,163 A | 3/1981 | Suzuki et al. | 204/181 T |
| 4,333,807 A | 6/1982 | Suzuki et al. | 204/181 T |
| 4,385,967 A | 5/1983 | Brady et al. | 204/27 |
| 4,502,933 A | 3/1985 | Mori et al. | 204/206 |
| 4,755,271 A | 7/1988 | Hosten | 204/198 |
| 4,793,867 A | 12/1988 | Charles et al. | 148/6.15 Z |
| 4,824,538 A * | 4/1989 | Hibino et al. | 204/512 |
| 4,844,783 A | 7/1989 | Takahashi et al. | 204/512 |
| 4,941,930 A | 7/1990 | Charles et al. | 148/260 |
| 5,203,975 A | 4/1993 | Richardson | 204/181.1 |
| 5,236,574 A | 8/1993 | Oshima et al. | 204/207 |
| 5,238,506 A | 8/1993 | Cape et al. | 148/262 |
| 5,264,096 A | 11/1993 | Jorgens | 204/484 |
| 5,264,254 A | 11/1993 | Bohnacker et al. | 427/470 |
| 5,271,144 A | 12/1993 | Barker | 29/527.2 |
| 5,326,596 A | 7/1994 | Kasari et al. | 427/379 |
| 5,417,828 A | 5/1995 | Sergio | 204/202 |
| 5,439,704 A | 8/1995 | Sankaran et al. | 427/195 |
| 5,463,804 A * | 11/1995 | McCleary et al. | 29/469.5 |
| 5,588,989 A | 12/1996 | Vonk et al. | 106/14.12 |
| 5,653,790 A | 8/1997 | Fotinos et al. | 106/14.12 |
| 5,882,734 A | 3/1999 | Blum et al. | 427/407.1 |
| 5,908,667 A | 6/1999 | Blum et al. | 427/407.1 |
| 5,985,106 A | 11/1999 | Velasquez | 204/202 |
| 6,350,359 B1 * | 2/2002 | Doebler et al. | 204/488 |
| 6,387,227 B1 | 5/2002 | Hamanaka et al. | 204/206 |
| 6,406,610 B1 | 6/2002 | Lowe | 204/198 |

* cited by examiner

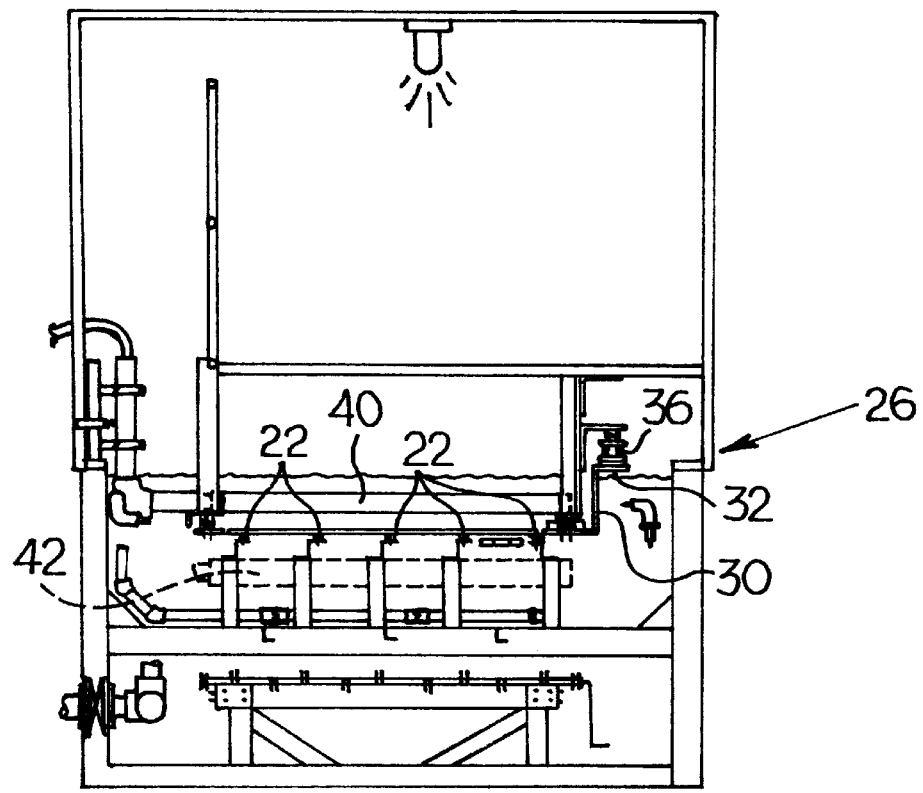
Fig. 3
Fig. 4
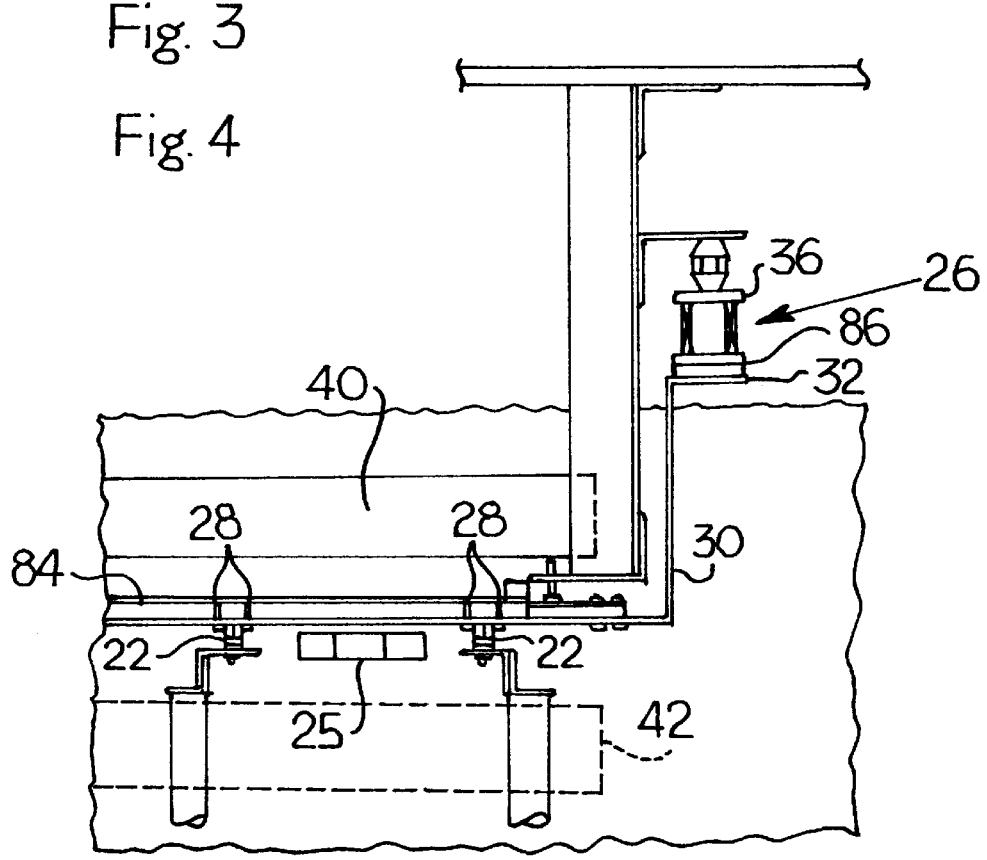

PROCESS FOR ELECTROCOATING METAL BLANKS AND COILED METAL SUBSTRATES

This application is related to U.S. patent application Ser. No. 09/798,103, pending entitled "Apparatus and Methods for Continuously Electrocoating Metal Blanks and/or Coiled Metal Substrates" of Donald Emmonds et al., and filed concurrently herewith, which related application is herein incorporated by reference in its entirety.

FIELD OF THE INVENTION

The present invention relates to processes for electrocoating pre-sheared metal blanks as well as to processes for electrocoating coiled metal substrates and subsequently forming metal blanks from the electrocoated substrates.

BACKGROUND OF THE INVENTION

Electrodeposition as a coating application method involves deposition of a film-forming composition onto a conductive substrate under the influence of an applied electrical potential. Electrodeposition has become increasingly important in the coatings industry because, by comparison with non-electrophoretic coating means, electrodeposition offers increased paint utilization, improved corrosion protection and low environmental contamination.

Initially, electrodeposition was conducted with the workpiece being coated serving as the anode. This was familiarly referred to as anionic or anodic electrodeposition. However, in 1972, cationic (or cathodic) electrodeposition was introduced commercially. Since that time, cationic electrodeposition has steadily gained in popularity and today is by far the most prevalent method of electrodeposition. For example, throughout the world, more than 80 percent of all motor vehicles produced are given a primer coating by cationic electrodeposition.

Multilayered coating composites for metal substrates, for example, substrates used in the appliance and automobile industries, typically have involved electrodeposition coatings as an initial resinous coating layer to protect the metal substrate from corrosion. However, two-coat application by the electrodeposition process is known in the art. For example U.S. Pat. Nos. 4,988,420; 4,840,715; and 5,275,707 disclose multi-layered composite coatings applied by electrodeposition wherein electroconductive pigments are included in a first electrodeposited acrylic resinous coating, and subsequently a second coating is electrodeposited over the conductive first coating. Typically, these second electrodeposition coatings are applied for durability and decorative purposes.

The term "blank" refers to a flat or substantially flat section cut or "sheared" from a coiled metal strip and subsequently formed into a part, such as front and side panels for appliances, e.g., refrigerators, washers and dryers, metal office furniture, e.g., filing cabinets and desks, and building products, e.g., fluorescent lighting fixtures. Often holes must be punched in the blanks.

Coated metal blanks can offer many advantages in the manufacture of such products. Coated blanks can be "stacked" for storage in a vertical stacker while awaiting subsequent coating, forming, fastening and/or assembly processes. This can result in a reduction of inventory storage space as well as a reduction in in-process inventory. Also, primed-only blanks which have been cut to specification for various end-use products can be stacked off-line awaiting subsequent top coating steps. A wide variety of top coating compositions (e.g., liquid coatings and powder coatings) can be applied to the primed blanks using various application techniques, for example, electrodeposition, spray or roll coating techniques. In this way, a wide variety of colors can be delivered in a relatively short time.

As mentioned above, blanks can be cut from pre-coated or pre-painted coiled metal substrates or, alternatively, from coiled metal stock prior to coating the coiled metal. Problems can arise when blanks are cut from pre-coated metal. The shearing of these blanks (thus creating blanks having "sheared edges") and the hole punching process typically creates exposed sheared ends and edges (i.e., edges devoid of protective coating), thus necessitating application of additional corrosion inhibitors to these areas. Special corrosion protection is especially critical if the finished product is subjected to high humidity conditions or aggressive detergents. Moreover, the coil-applied coating must meet strict flexibility requirements in order to withstand the shearing and punching processes without fracturing and/or losing adhesion at the edges of the sheared/punched area, as well as post-forming processes.

For the above-stated reasons, blanks cut from uncoated coiled metal stock, which are subsequently coated and formed into parts, can offer several advantages. First, sheared ends and edges are coated during the overall coating process, thus eliminating the additional step of applying a corrosion inhibitor to these edges. Further, although the coatings applied to pre-sheared blanks must meet the flexibility requirements necessary for withstanding post-forming processes, the need for coatings capable of withstanding the harsh shearing and punching processes is eliminated.

U.S. Pat. No. 5,439,704 teaches a combined coil and blank powder coating line which has the capability of coating coiled metal strips to form pre-coated metal coil stock as well as coating pre-sheared and/or punched blanks with the same coating line. Due to the necessity of placing the blanks on a horizontal support surface for transport, however, only the topside of the blank can be powder coated, thus leaving the underside uncoated.

U.S. Pat. No. 5,908,667 discloses a process for producing a multilayer lacquer coating of low dry film thickness in which a primer of an electrodepositable aqueous coating composition is electrophoretically applied onto (presumably both sides of) a conductive substrate and subsequently cured to form an electrically conductive primer on the substrate. A base coat is formed thereover by electrodeposition of a color-giving and/or effect-producing aqueous electrodepositable coating composition. The multilayer coating process is particularly useful for coating automobiles or pre-formed automobile parts.

It would be desirable to provide a post-formable, multi-layer composite coating on a metal blank using, at least in part, an electrodeposition process. The process would advantageously include electrodeposition of a corrosion inhibitive conductive primer to the blank surfaces followed by electrodeposition of an appearance enhancing top coat, or, alternatively, application of a non-electrophoretic top coating. Such a process would provide the aforementioned desired coating properties with efficient paint utilization and fast cure times.

BRIEF DESCRIPTION OF THE DRAWINGS

FIG. 3 is a sectional view of the electrocoating apparatus of FIG. 2 taken along the line III—III;

FIG. 4 is an enlarged view of an exemplary connecting system of the electrocoating apparatus shown in FIG. 2.

SUMMARY OF THE INVENTION

Figure 1:
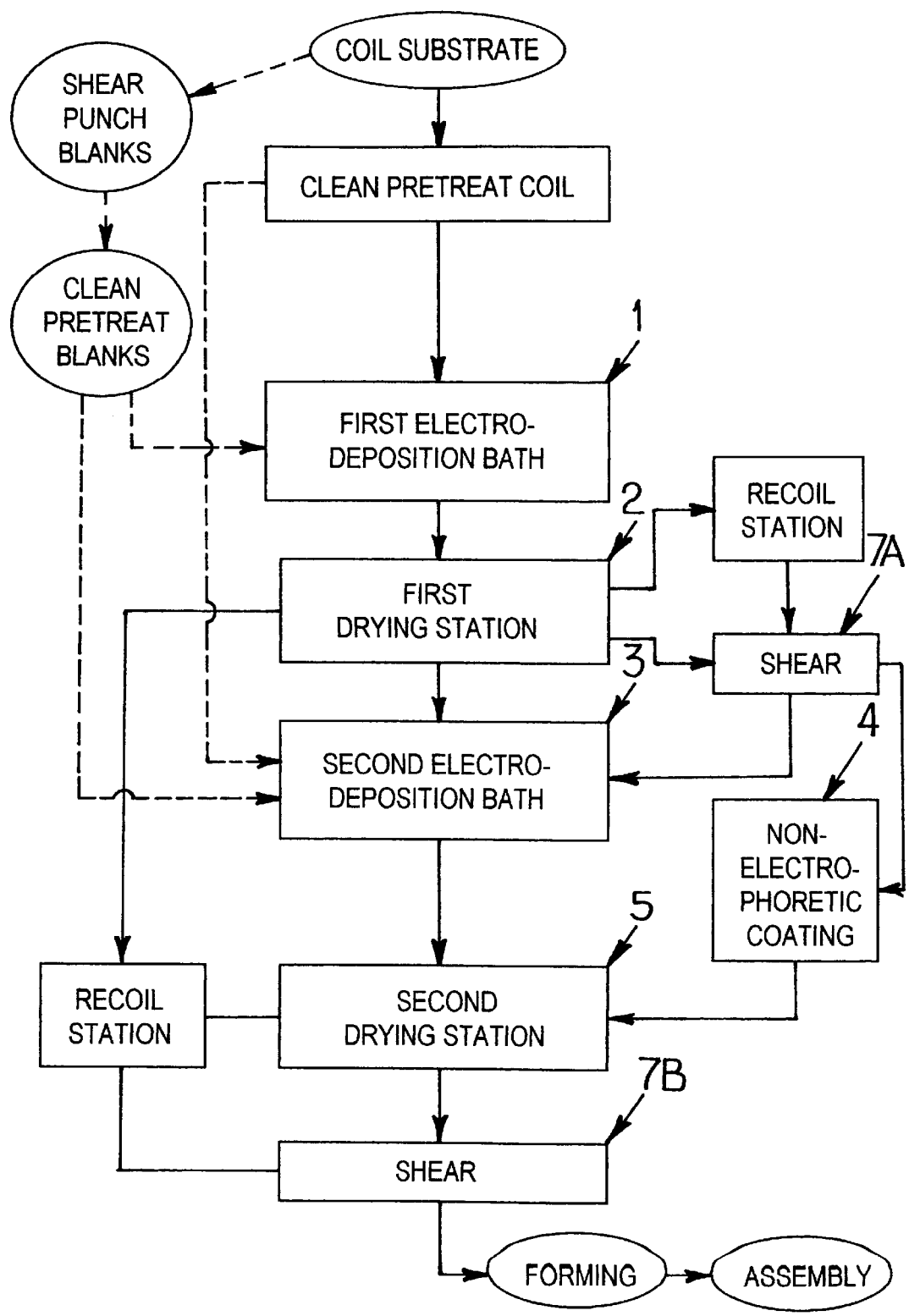
FIG. 1 is a flow chart depicting the shearing and coating steps used in the processes of the present invention for forming and coating blanks and/or continuous metal strips.

The present invention is directed to a process for forming a coating on a pre-sheared, electroconductive flat blank having two major surfaces and sheared edges. The process comprises the steps of (1) conveying the blank to an electrodeposition bath located on a coating line; (2) applying an aqueous electrodepositable coating composition to both major surfaces and the sheared edges of the blank as the blank passes through the electrodeposition bath, the blank serving as an electrode in an electrical circuit comprising the electrode and a counter-electrode immersed in the aqueous electrodepositable coating composition, the composition being deposited onto both major surfaces and the sheared edges of the blank as a substantially continuous coating as electric current is passed between the electrodes; (3) conveying the coated blank of step (2) from the electrodeposition bath to a drying station located on the coating line; and (4) drying the electrodeposited coating as it passes through the drying station.

The present invention is also directed to a process for forming a multi-composite coating on a pre-sheared, electroconductive, flat blank having two major surfaces and sheared edges. The process comprises the steps of (1) conveying the blank to a first electrodeposition bath located on a coating line; (2) applying a first aqueous electrodepositable coating composition to both major surfaces and the sheared edges of the blank as it passes through the electrodeposition, the blank serving as an electrode in an electrical circuit comprising the electrode and a counter-electrode immersed in the aqueous electrodepositable coating composition, the composition being deposited onto both major surfaces and the sheared edges of the blank as a substantially continuous electroconductive coating as electric current is passed between the electrodes; (3) optionally, conveying the coated blank of step (2) from the first electrodeposition bath to a first drying station located on the coating line; and drying the electroconductive coating as it passes through the first drying station; (4) conveying the coated blank of step (2) or, optionally, step (3), to a second electrodeposition bath located on the coating line; (5) applying a second electrodepositable coating composition to the coated blank as it passes through the second electrodeposition bath, the blank serving as an electrode in an electrical circuit comprising the electrode and a counter-electrode immersed in the second aqueous electrodepositable coating composition, the composition being deposited onto one of the major surfaces of the coated blank as a substantially continuous electrically insulating coating as electric current is passed between the electrodes; (6) conveying the coated blank of step (5) to a drying station located on the coating line; and (7) drying the electrically insulating coating as the blank of step (6) passes through the drying station.

Also, the present invention is directed to a pre-sheared, flat electroconductive blank having two major surfaces and coated with a multi-layer composite coating composition on one major surface. The multi-layer composite coating composition comprises (a) a corrosion-resistant, electrically conductive first coating electrodeposited over both major surfaces of the blank from a first aqueous electrodepositable coating composition. The first aqueous electrodepositable coating composition comprises (i) an electrodepositable ionic resin, and (ii) one or more electrically conductive pigments. An appearance enhancing, electrically insulating top coating is electrodeposited over the electrically conductive first coating on one major surface of the blank from an aqueous electrodepositable top coating composition.

The present invention is also further directed to various methods for forming and coating metal blanks. In one embodiment of the present invention, the method comprises the steps of (1) supplying a continuous metal strip from a coil through an entrance of a shear located prior to an entrance end of an electrodeposition bath located on a coating line; (2) shearing the metal strip to form a blank having two major surfaces and sheared edges as the metal strip passes through the shear; (3) conveying the blank formed in step (2) to the electrodeposition bath; (4) applying one of the previously described electrodepositable coating composition to the blank as it passes through the bath, the blank serving as an electrode in an electrical circuit comprising the electrode and a counter-electrode immersed in the aqueous electrodepositable coating composition, the composition being deposited onto both major surfaces and the sheared edges of the blank as a substantially continuous coating as electric current is passed between the electrodes; (5) conveying the coated blank of step (4) to a drying station located on the coating line; and (6) drying the coated blank as it passes through the drying station.

In another embodiment, the present invention is directed to a method for forming and coating metal blanks comprising the steps of (1) supplying a continuous metal strip from a coil through an entrance of a shear located prior to an entrance end of a first electrodeposition bath located on a coating line; (2) shearing the metal strip to form a blank having two major surfaces and sheared edges as the metal strip passes through the shear; (3) conveying the blank formed in step (2) to the first electrodeposition bath; (4) applying a first aqueous electrodepositable coating composition to both major surfaces and the sheared edges of the blank as it passes through the first electrodeposition bath, the blank serving as an electrode in an electrical circuit comprising the electrode and a counter-electrode immersed in the first aqueous electrodepositable coating composition, the composition being deposited onto both major surfaces and the sheared edges of the blank as a substantially continuous electrically conductive coating as electric current is passed between the electrodes; (5) optionally, conveying the coated blank of step (4) to a first drying station located in the coating line, and drying the coated blank as it passes through the drying station; (6) conveying the coated blank of step (4) or, optionally, step (5) to a second electrodeposition bath located on the coating line; (7) applying a second electrodepositable coating composition to the coated blank as it passes through the second electrodeposition bath, the blank serving as an electrode in an electrical circuit comprising the electrode and a counter-electrode immersed in the second aqueous electrodepositable coating composition, the composition being deposited onto one of the major surfaces of the coated blank as a substantially continuous electrically insulating coating as electric current is passed between the electrodes; (8) conveying the coated blank of step (7) to a drying station located on the coating line; and (9) drying the electrically insulating coating as the blank passes through the drying station.

The present invention is also directed to methods for coating a continuous metal strip and thereafter forming a coated blank therefrom. In one embodiment, the method comprises the steps of (1) supplying a continuous metal strip having two major surfaces to the entrance of an electrodeposition bath located on a coating line; (2) applying an electrodepositable coating composition to both major surfaces of the metal strip as it passes through the bath, the metal strip serving as an electrode in an electrical circuit comprising the electrode and a counter-electrode immersed in the aqueous electrodepositable coating composition, the composition being deposited onto both major surfaces of the metal strip as a substantially continuous coating as electric current is passed between the electrodes; (3) conveying the metal strip from step (2) to a drying station located on the coating line; (4) drying the electrodeposited coating as the metal strip passes through the drying station; (5) optionally, conveying the coated metal strip from step (4) to a recoiling station and recoiling the coated metal strip; (6) conveying the coated metal strip from step (4) or, optionally, the recoiled coated metal strip of step (5) to an entrance of a shear located at an exit end of the drying station; and (7) shearing the coated metal strip to form a coated blank as the strip passes through the shear.

Additionally, the present invention is directed to a method for coating a continuous metal strip, thereafter forming a coated blank therefrom and then applying a second coating to the blank. The method comprises the steps of (1) supplying a continuous metal strip having two major surfaces to an entrance of an electrodeposition bath located on a coating line; (2) applying a first electrodepositable coating composition to both major surfaces of the metal strip as it passes through the bath, the metal strip serving as an electrode in an electrical circuit comprising the electrode and a counter-electrode immersed in the first aqueous electrodepositable coating composition, the composition being deposited onto both major surfaces of the metal strip as a substantially continuous electrically conductive coating as electric current is passed between the electrodes; (3) optionally, conveying the metal strip from step (2) to a first drying station located on the coating line, and drying the electrically conductive coating as the metal strip passes through the first drying station; (4) optionally, conveying the coated metal strip of step (3) to a recoiling station located off the coating line, and recoiling the coated metal strip; (5) transferring the coated metal strip from step (2), or, optionally, step (3) or step (4) to an entrance of a shear located at an exit end of the drying station; (6) shearing the coated metal strip to form a coated blank as the metal strip passes through the shear; (7) conveying the coated blank from step (6) to a second electrodeposition bath located in the coating line; (8) applying a second electrodepositable coating composition to one of the major surfaces of the coated blank as it passes through the second electrodeposition bath, the blank serving as an electrode in an electrical circuit comprising the electrode and a counter-electrode immersed in the second aqueous electrodepositable coating composition, the composition being deposited onto one major surface of the coated blank as a substantially continuous electrically insulating coating as electric current is passed between the electrodes; (9) conveying the coated blank of step (8) to a drying station located on the coating line; and (10) drying the electrically insulating coating as the blank of step (9) passes through the drying station.

The present invention is also directed to a method for coating a continuous metal strip and thereafter forming a coated blank therefrom comprising the steps of (1) supplying a continuous metal strip having two major surfaces to an entrance of an electrodeposition bath located on a coating line; (2) applying a first electrodepositable coating composition to both major surfaces of the metal strip as it passes through the bath, the metal strip serving as an electrode in an electrical circuit comprising the electrode and a counter-electrode immersed in the first aqueous electrodepositable coating composition, the composition being deposited onto both major surfaces of the metal strip as a substantially continuous electrically conductive coating as electric current is passed between the electrodes; (3) optionally, conveying the metal strip from step (2) to a first drying station located on the coating line, and drying the electrically conductive coating as the metal strip passes through the first drying station; (4) optionally, conveying the coated metal strip of step (3) to a recoiling station located off the coating line, and recoiling the coated metal strip; (5) conveying the coated metal strip from step (3) or, optionally step (4) to a second electrodeposition bath located on the coating line; (6) applying a second electrodepositable coating composition to one of the major surfaces of the coated metal strip as it passes through the second electrodeposition bath, the metal strip serving as an electrode in an electrical circuit comprising the electrode and a counter-electrode immersed in the second aqueous electrodepositable coating composition, the composition being deposited onto one of the major surfaces of the coated metal strip as a substantially continuous electrically insulating coating as electric current is passed between the electrodes; (7) conveying the coated metal strip of step (6) to a drying station located on the coating line; (8) drying the electrically insulating coating as the coated metal strip of step (7) passes through the drying station; (9) optionally, transferring the coated metal strip of step (8) to a recoiling station located off the coating line, and recoiling the coated metal strip; (10) transferring the coated metal strip from step (8), or, optionally, step (9) to an entrance of a shear located at an exit end of the drying station; and (11) shearing the coated metal strip to form a coated blank as the metal strip passes through the shear.

In a further embodiment, the present invention is directed to a method for forming a coating on one major surface of a pre-sheared, electroconductive, flat blank having two major surfaces and sheared edges. The method comprises the steps of (1) conveying the blank to an electrodeposition bath located on a coating line; (2) applying an aqueous electrodepositable coating composition to one major surface and the sheared edges of the blank as the blank passes through the electrodeposition bath, the blank serving as an electrode in an electrical circuit comprising the electrode and a counter-electrode immersed in the aqueous electrodepositable coating composition, the composition being deposited onto one major surface and the sheared edges of the blank as a substantially continuous coating as electric current is passed between the electrodes; (3) conveying the coated blank of step (2) from the electrodeposition bath to a drying station located on the coating line; and (4) drying the electrodeposited coating as it passes through the drying station.

Also, the present invention is directed to a method for forming and coating metal blanks comprising (1) supplying a continuous metal strip from a coil through an entrance of a shear located prior to an entrance end of an electrodeposition bath located on a coating line; (2) shearing the metal strip to form a flat blank having two major surfaces and sheared edges as the metal strip passes through the shear; (3) conveying the blank formed in step (2) to the electrodeposition bath; (4) applying an electrodepositable coating composition to the blank as it passes through the bath, the blank serving as an electrode in an electrical circuit comprising the electrode and a counter-electrode immersed in the aqueous electrodepositable coating composition, the composition being deposited onto one major surface and the sheared edges of the blank as a substantially continuous coating as electric current is passed between the electrodes; (5) conveying the coated blank of step (4) to a drying station located on the coating line; and (6) drying the coated blank as it passes through the drying station.

The present invention also provides a method for coating a continuous metal strip comprising (1) supplying a continuous metal strip having two major surfaces to the entrance of an electrodeposition bath located on a coating line; (2) applying an electrodepositable coating composition to one major surface of the metal strip as it passes through the bath, the metal strip serving as an electrode in an electrical circuit comprising the electrode and a counter-electrode immersed in the aqueous electrodepositable coating composition, the composition being deposited onto one major surface of the metal strip as a substantially continuous coating as electric current is passed between the electrodes; (3) conveying the metal strip from step (2) to a drying station located on the coating line; (4) drying the electrodeposited coating as the metal strip passes through the drying station; and (5) optionally, conveying the coated metal strip from step (4) to a recoiling station and recoiling the coated metal strip.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As discussed above, in one embodiment, the present invention provides a process for forming an electrodepositable coating on a pre-sheared, electroconductive, flat blank having two major surfaces and sheared edges (hereinafter referred to as a "blank"). The blanks typically, but not necessarily, are cut or "sheared" from coiled metal substrates prior to coating.

As used herein, by "flat" or "substantially flat" is meant substantially planar in form, that is, a primarily level substrate lying in a geometric plane, which, as would be understood by one skilled in the art, can include slight bends, projections or depressions therein.

The metallic substrates, whether in the form of a coiled metal strip or a blank, which are used in the practice of the present invention can include ferrous metals and non-ferrous metals. Suitable ferrous metals include iron, steel, and alloys thereof. Non-limiting examples of useful steel materials include cold-rolled steel, galvanized (zinc coated) steel, electrogalvanized steel, stainless steel, pickled steel, GALVANNEAL, GALVALUME, and GALVAN zinc-aluminum alloys coated upon steel, and combinations thereof. Useful non-ferrous metals include aluminum, zinc, magnesium and alloys thereof. Combinations or composites of ferrous and non-ferrous metals can also be used.

Before depositing coatings upon the surface of the metallic substrate, it is preferred to remove foreign matter from the metal surface by thoroughly cleaning and/or degreasing the substrate surface. As used herein, the terms "deposited upon" and "provided upon" a substrate mean deposited or provided above or over but not necessarily adjacent to the surface of the substrate. For example, a coating can be deposited directly upon the substrate or one or more other coatings can be applied therebetween.

The surface of the metallic substrate can be cleaned by physical or chemical means, such as mechanically abrading the surface or, as is typical, cleaning/degreasing with commercially available alkaline or acidic cleaning agents which are well known to those skilled in the art, such as sodium metasilicate and sodium hydroxide. Non-limiting examples of suitable cleaning agents include CHEMKLEEN® 163 and CHEMKLEEN® 177 phosphate cleaners, both of which are commercially available from PPG Industries, Inc. of Pittsburgh, Pa.

Following the cleaning step, the surface of the metallic substrate may be rinsed with water, typically deionized water, in order to remove any residue. Optionally, the metal surface can be rinsed with an aqueous acidic solution after cleaning with the alkaline cleaners. Examples of rinse solutions include mild or strong acidic cleaners such as the dilute nitric acid solutions commercially available and conventionally used in metal pretreatment processes. The metallic substrate can be air-dried using an air knife, by flashing off the water by brief exposure of the substrate to a high temperature or by passing the substrate between squeegee rolls.

Optionally, a phosphate-based pretreatment or conversion coating can be applied to the metallic substrate. Suitable phosphate conversion coating compositions include those known in the art, such as zinc phosphate, optionally modified with nickel, iron, manganese, calcium, magnesium or cobalt. Useful phosphating compositions are described in U.S. Pat. Nos. 4,793,867 and 5,588,989; 4,941,930; 5,238,506 and 5,653,790.

The coiled metal substrate can undergo cleaning and pretreatment steps prior to coating or forming the blanks, or, alternatively, the pre-sheared blanks can undergo similar cleaning and pretreatment steps prior to coating.

The pre-sheared blanks are loaded onto a conveyor mechanism, which typically is composed primarily of a non-conductive material, for movement throughout the coating line. The conveyor may be of any convenient type, such as, but not limited to, a belt conveyor, a chain conveyor a platform conveyor and the like.

With reference to FIG. 1, in step (1), the pre-sheared blanks are conveyed to the entrance of an electrodeposition bath tank (1) located on a coating line (A). The electrodeposition bath (1) contains an aqueous electrodeposition bath composition.

The electrodeposition bath composition useful in the methods of the present invention comprises a resinous phase dispersed in an aqueous medium. The resinous phase includes a film-forming organic component which can comprise an anionic electrodepositable coating composition, or, as is preferred, a cationic electrodepositable coating composition. The electrodepositable coating composition typically comprises an active hydrogen group-containing ionic resin and a curing agent having functional groups reactive with the active hydrogens of the ionic resin.

As used herein, the term "reactive" refers to a functional group that forms a covalent bond with another functional group under suitable reaction conditions.

Non-limiting examples of anionic electrodepositable coating compositions include those comprising an ungelled, water-dispersible electrodepositable anionic film-forming resin. Examples of film-forming resins suitable for use in anionic electrodeposition coating compositions are base-solubilized, carboxylic acid containing polymers, such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxyalkyl esters of unsaturated carboxylic acids, unsaturated carboxylic acid and at least one other ethylenically unsaturated monomer. Yet another suitable electrodepositable anionic resin comprises an alkyd-aminoplast vehicle, i.e., a vehicle containing an alkyd resin and an amine-aldehyde resin. Yet another anionic electrodepositable resin composition comprises mixed esters of a resinous polyol. These compositions are described in detail in U.S. Pat. No. 3,749,657 at col. 9, lines 1 to 75 and col. 10, lines 1 to 13. Other acid functional polymers can also be used such as phosphatized polyepoxide or phosphatized acrylic polymers as are well known to those skilled in the art.

By "ungelled" is meant that the polymer is substantially free of crosslinking and has an intrinsic viscosity when dissolved in a suitable solvent. The intrinsic viscosity of a polymer is an indication of its molecular weight. A gelled polymer, on the other hand, since it is of essentially infinitely high molecular weight, will have an intrinsic viscosity too high to measure.

With reference to the cationic resin, a wide variety of cationic polymers are known and can be used in the compositions of the invention so long as the polymers are "water dispersible," i.e., adapted to be solubilized, dispersed or emulsified in water. The water dispersible resin is cationic in nature, that is, the polymer contains cationic functional groups to impart a positive charge. Preferably, the cationic resin also contains active hydrogen groups.

Examples of cationic resins suitable include onium salt group-containing resins such as ternary sulfonium salt group-containing resins and quaternary phosphonium salt-group containing resins, for example, those described in U.S. Pat. Nos. 3,793,278 and 3,984,922, respectively. Other suitable onium salt group-containing resins include quaternary ammonium salt group-containing resins, for example, those which are formed from reacting an organic polyepoxide with a tertiary amine salt. Such resins are described in U.S. Pat. Nos. 3,962,165; 3,975,346; and 4,001,101. Also suitable are the amine salt group-containing resins such as the acid-solubilized reaction products of polyepoxides and primary or secondary amines such as those described in U.S. Pat. Nos. 3,663,389; 3,984,299; 3,947,338 and 3,947,339.

Usually, the above-described salt group-containing resins described above are used in combination with a blocked isocyanate curing agent. The isocyanate can be fully blocked as described in the aforementioned U.S. Pat. No. 3,984,299 or the isocyanate can be partially blocked and reacted with the resin backbone such as is described in U.S. Pat. No. 3,947,338.

Also, one-component compositions as described in U.S. Pat. No. 4,134,866 and DE-OS No. 2,707,405 can be used as the cationic resin. Besides the epoxy-amine reaction products, resins can also be selected from cationic acrylic resins such as those described in U.S. Pat. Nos. 3,455,806 and 3,928,157. Also, cationic resins which cure via transesterification such as described in European Application No. 12463 can be used. Further, cationic compositions prepared from Mannich bases such as described in U.S. Pat. No. 4,134,932 can be used. Also useful in the electrodepositable coating compositions of the present invention are those positively charged resins which contain primary and/or secondary amine groups. Such resins are described in U.S. Pat. Nos. 3,663,389; 3,947,339; and 4,115,900. U.S. Pat. No. 3,947,339 describes a polyketimine derivative of a polyamine such as diethylenetriamine or triethylenetetraamine with the excess polyamine vacuum stripped from the reaction mixture. Such products are described in U.S. Pat. Nos. 3,663,389 and 4,116,900.

In one embodiment of the present invention, the cationic resins suitable for inclusion in the electrodepositable coating compositions useful in the methods of the present invention are onium salt group-containing acrylic resins.

The cationic resin described immediately above is typically present in the electrodepositable coating compositions in amounts of 1 to 60 weight percent, preferably 5 to 25 weight percent based on total weight of the composition.

As previously discussed, the electrodepositable coating compositions which are useful in the methods of the present invention typically further comprise a curing agent which contains functional groups which are reactive with the active hydrogen groups of the ionic resin.

Aminoplast resins, which are the preferred curing agents for anionic electrodeposition, are the condensation products of amines or amides with aldehydes. Examples of suitable amine or amides are melamine, benzoguanamine, urea and similar compounds. Generally, the aldehyde employed is formaldehyde, although products can be made from other aldehydes such as acetaldehyde and furfural. The condensation products contain methylol groups or similar alkylol groups depending on the particular aldehyde employed. Preferably, these methylol groups are etherified by reaction with an alcohol. Various alcohols employed include monohydric alcohols containing from 1 to 4 carbon atoms such as methanol, ethanol, isopropanol, and n-butanol, with methanol being preferred. Aminoplast resins are commercially available from American Cyanamid Co. under the trademark CYMEL® and from Monsanto Chemical Co. under the trademark RESIMENE®.

The aminoplast curing agents are typically utilized in conjunction with the active hydrogen containing anionic electrodepositable resin in amounts ranging from about 5 percent to about 60 percent by weight, preferably from about 20 percent to about 40 percent by weight, the percentages based on the total weight of the resin solids in the electrodeposition bath.

The curing agents most often employed for cationic electrodepositable coating compositions are blocked organic polyisocyanates. The polyisocyanates can be fully blocked as described in U.S. Pat. No. 3,984,299 column 1 lines 1 to 68, column 2 and column 3 lines 1 to 15, or partially blocked and reacted with the polymer backbone as described in U.S. Pat. No. 3,947,338 column 2 lines 65 to 68, column 3 and column 4 lines 1 to 30. By "blocked" is meant that the isocyanate groups have been reacted with a compound so that the resultant blocked isocyanate group is stable to active hydrogens at ambient temperature but reactive with active hydrogens in the film forming polymer at elevated temperatures, usually between 90° C. and 200° C.

Suitable polyisocyanates include aromatic and aliphatic polyisocyanates, including cycloaliphatic polyisocyanates and representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates such as triisocyanates can be used. An example would include triphenylmethane-4,4',4''-triisocyanate. Isocyanate prepolymers with polyols such as neopentyl glycol and trimethylolpropane and with polymeric polyols such as polycaprolactone diols and triols (NCO/OH equivalent ratio greater than 1) can also be used.

The polyisocyanate curing agents are typically utilized in conjunction with the cationic resin in amounts ranging from 1 weight percent to 65 weight percent, preferably from 5 weight percent to 45 weight percent, based on the weight of the total resin solids present composition.

The aqueous compositions of the present invention are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 1.0 and usually less than 0.5 microns, preferably less than 0.15 micron.

The concentration of the resinous phase in the aqueous medium is at least 1 and usually from about 2 to about 60 percent by weight based on total weight of the aqueous dispersion. When the compositions of the present invention are in the form of resin concentrates, they generally have a resin solids content of about 20 to about 60 percent by weight based on weight of the aqueous dispersion.

Electrodeposition baths useful in the methods of the present invention are typically supplied as two components: (1) a clear resin feed, which includes generally the active hydrogen-containing ionic electrodepositable resin, i.e., the main film-forming polymer, the curing agent, and any additional water-dispersible, non-pigmented components; and (2) a pigment paste, which generally includes one or more pigments, a water-dispersible grind resin which can be the same or different from the main-film forming polymer, and, optionally, additives such as wetting or dispersing aids. Electrodeposition bath components (1) and (2) are dispersed in an aqueous medium which comprises water and, usually, coalescing solvents.

The electrodeposition bath of the present invention has a resin solids content usually within the range of about 5 to 25 percent by weight based on total weight of the electrodeposition bath.

As aforementioned, besides water, the aqueous medium may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol. The amount of coalescing solvent is generally between about 0.01 and 25 percent and when used, typically from about 0.05 to about 5 percent by weight based on total weight of the aqueous medium.

As discussed above, a pigment composition and, if desired, various additives such as surfactants, wetting agents or catalyst can be included in the dispersion. The pigment composition may be of the conventional type comprising pigments, for example, iron oxides, strontium chromate, carbon black, coal dust, titanium dioxide, talc, barium sulfate, as well as color pigments such as cadmium yellow, cadmium red, chromium yellow and the like.

The pigment content of the dispersion is usually expressed as a pigment-to-resin ratio. In the practice of the invention, when pigment is employed, the pigment-to-resin ratio is usually within the range of about 0.02 to 1:1. The other additives mentioned above are usually in the dispersion in amounts of about 0.01 to 3 percent by weight based on weight of resin solids.

In step (2) the aqueous electrodepositable coating composition is applied to both major surfaces and the sheared edges of the blank as the blank passes through the electrodeposition bath. In the process of the present invention, the blank serves as an electrode, preferably the cathode, in an electrical circuit comprising the electrode and a counter-electrode which are immersed in the aqueous electrodepositable coating composition. The composition is deposited onto both major surfaces and the sheared edges of the blank as a substantially continuous coating as electric current is passed between the two electrodes.

In the process of applying the electrodepositable coating, the aqueous dispersion of the electrodepositable composition is placed in contact with an electrically conductive anode and cathode. Upon passage of an electric current between the anode and cathode, an adherent film of the electrodepositable composition will deposit in a substantially continuous manner on the substrate serving as either the anode or the cathode depending on whether the composition is anionically or cationically electrodepositable. Electrodeposition is usually carried out at a constant voltage ranging from 1 volt to 7,000 volts, and typically between 50 and 500 volts. Current density is usually between about 1.0 ampere and 15 amperes per square foot (10.8 to 161.5 amperes per square meter).

In step (3) the coated blank is conveyed from the electrodeposition bath (1) to a first drying station (2) located on the coating line (A), and in step (4) the electrodeposited coating is dried as it passes through the first drying station (2).

As used herein the term "dried" is intended to include both drying and curing. In one embodiment, the electrodeposited coating is dried by driving substantially all the solvent and/or water from the coating either by evaporation at ambient temperature or by forced drying at elevated temperatures (for example 150° F. to 800° F. (82° C. to 426° C.)). The term "dried" is also intended to include "cured" as by exposing the electrocoated substrate to thermal conditions sufficient to effectuate crosslinking of the co-reactive film components.

Also, as used herein, the term "cure" as used in connection with a composition, e.g., "a cured composition," shall mean that any crosslinkable or co-reactive components of the composition are at least partially crosslinked or co-reacted. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen. This method determines the glass transition temperature and crosslink density of free films of coatings or polymers. These physical properties of a cured material are related to the structure of the crosslinked network.

According to this method, the length, width, and thickness of a sample to be analyzed are first measured, the sample is tightly mounted to the Polymer Laboratories MK III apparatus, and the dimensional measurements are entered into the apparatus. A thermal scan is run at a heating rate of 3° C./min, a frequency of 1 Hz, a strain of 120%, and a static force of 0.01N, and sample measurements occur every two seconds. The mode of deformation, glass transition temperature, and crosslink density of the sample can be determined according to this method. Higher crosslink density values indicate a higher degree of crosslinking in the coating.

Generally, the electrodepositable coating compositions which are useful in the methods of the present invention are applied under conditions such that a substantially continuous coating having a dried film-thickness ranging from 0.1 to 1.8 mils (2.54 to 45.72 micrometers), usually from 0.15 to 1.6 mils (30.48 to 40.64 micrometers) is formed upon both major surfaces of the metal blank.

In one embodiment of the present invention, after the coating has been applied by electrodeposition, it is cured, usually by baking, at elevated temperatures ranging from 90° C. to 430° C. for a period ranging from 60 to 1200 seconds. The first drying station (2) can be any of a variety of curing ovens, both electric and gas powered, that are well known in the art for use on coating lines. Alternatively, the coating can be cured using infrared curing techniques as are well known in the art, typically for a period ranging from 45 to 240 seconds or a time sufficient to obtain a peak metal temperature ranging from 300° to 700° F. (148.90 to 371.1° C.).

It should be understood that the electrocoating applied by the method described immediately above can be an electrocoating primer suitable as a primary coating for subsequent application of a non-electrophoretic coating as described in detail below. Alternatively, the electrocoating can be an appearance-enhancing electrodeposited top coating. In the case of a primer coating, the electrodepositable coating composition is such that a substantially continuous primer coating having a dried film-thickness ranging from 0.1 to 0.4 mils (2.54 to 81.28 micrometers), usually from 0.15 to 2.5 mils (30.48 to 50.8 micrometers) is formed upon both major surfaces of the metal blank. In the case of an appearance-enhancing top coat, the electrodepositable coating composition is applied such that a substantially continuous top coating having a dried film-thickness ranging from 0.8 to 1.8 mils (20.32 to 45.72 micrometers), usually from 1.0 to 1.6 mils (25.4 to 40.6 micrometers) is formed upon both major surfaces of the metal blank.

As mentioned above, the method described immediately above can further comprise the steps of conveying the electrocoated blanks to a second coating station (4) located on the coating line (A); applying a second non-electrophoretic coating composition to at least one major surface of the blank as it passes through the coating station (4) to form a continuous coating thereon; conveying the coated blank to a second drying station (5) located on the coating line (A); and drying the coating as it passes through the second drying station (5).

The non-electrophoretic coating composition can be any of a variety of coating compositions well known in the art and the specific composition utilized is generally dependent upon the final appearance and performance properties dictated by the end use of the coated substrate. For example, the non-electrophoretic coating composition can be a liquid coating composition or in solid particulate form, e.g., a powder coating composition.

The second non-electrophoretic coating composition when in liquid form can be applied by any of the conventional liquid coating application techniques well known in the art as discussed below. Typically when the second non-electrophoretic coating composition is in liquid form, the second coating station (4) comprises a spray booth for spray application of the second coating composition or, alternatively, a roll-coating apparatus for roll-application of the second coating composition. Suitable spray booths as are well known in the art can be configured to accommodate conventional as well as electrostatic spray apparatus.

Likewise, when the second non-electrophoretic coating composition is a powder coating composition, the second coating station (4) comprises a suitably equipped powder spray booth for electrostatic spray application of the powder composition.

Liquid coating compositions suitable for use as the non-electrophoretic coating composition in the method of the present invention can be any of the wide variety of liquid film-forming compositions known in the art. For example, suitable liquid coating compositions typically comprise a film-forming composition which includes a resinous binder system and, optionally, one or more pigments to serve as a colorant. The resinous binder system typically comprises a film-forming polymer. Depending upon the functionality of the film-forming polymers, the film-forming compositions can also contain one or more crosslinking agents reactive with the functionality of the polymer.

Non-limiting examples of film-forming polymers having reactive functional groups which are useful in the liquid coating compositions include those selected from acrylic, polyester, polyurethane, polyepoxide and polyether polymers. As mentioned above, the film-forming polymer typically comprises reactive functional groups, for example, hydroxyl, epoxy, carboxyl, isocyanate and carbamate functional groups or, if desired, a combination thereof. Hydroxyl group-containing acrylic polymers and/or polyester polymers are often employed.

Suitable functional group-containing acrylic polymers include copolymers prepared from one or more alkyl esters of acrylic acid or methacrylic acid and, optionally, one or more other polymerizable ethylenically unsaturated monomers. Suitable alkyl esters of acrylic or methacrylic acid include methyl (meth)acrylate, ethyl (meth)acrylate, butyl (meth)acrylate, and 2-ethylhexyl (meth)acrylate. As used herein, the term "(meth)acrylate" and like terms is intended to include both methacrylates and acrylates. Ethylenically unsaturated carboxylic acid functional monomers, for example acrylic acid and/or methacrylic acid, can also be used when a carboxylic acid functional acrylic polymer is desired. Non-limiting examples of other polymerizable ethylenically unsaturated monomers include vinyl aromatic compounds, such as styrene and vinyl toluene; nitriles, such as acrylonitrile and methacrylonitrile; vinyl and vinylidene halides, such as vinyl chloride and vinylidene fluoride and vinyl esters, such as vinyl acetate.

In one embodiment of the present invention, the acrylic polymers contain hydroxyl functionality which can be incorporated into the acrylic polymer through the use of one or more hydroxyl functional monomers such as hydroxyethyl acrylate, hydroxypropyl acrylate, hydroxyethyl methacrylate and hydroxypropyl methacrylate which may be copolymerized with the other acrylic monomers mentioned above.

The acrylic polymer also can be prepared from ethylenically unsaturated, beta-hydroxy ester functional monomers. Such monomers are derived from the reaction of an ethylenically unsaturated acid functional monomer, such as monocarboxylic acids, for example, acrylic acid, and an epoxy compound which does not participate in the free radical initiated polymerization with the unsaturated acid monomer. Examples of such epoxy compounds are glycidyl ethers and esters. Suitable glycidyl ethers include glycidyl ethers of alcohols and phenols, such as butyl glycidyl ether, octyl glycidyl ether, phenyl glycidyl ether and the like. Suitable glycidyl esters include those which are commercially available from Shell Chemical Company under the tradename CARDURA® E; and from Exxon Chemical Company under the tradename GLYDEXX®-10.

Alternatively, the beta-hydroxy ester functional monomers are prepared from an ethylenically unsaturated, epoxy functional monomer, for example glycidyl methacrylate and allyl glycidyl ether, and a saturated carboxylic acid, such as a saturated monocarboxylic acid, for example, isostearic acid.

The acrylic polymer is typically prepared by solution polymerization techniques in the presence of suitable initiators such as organic peroxides or azo compounds, for example, benzoyl peroxide or N,N-azobis(isobutylronitrile). The polymerization can be carried out in an organic solution in which the monomers are soluble by techniques conventional in the art.

Pendent and/or terminal carbamate functional groups can be incorporated into the acrylic polymer by copolymerizing the acrylic monomer with a carbamate functional vinyl monomer, such as a carbamate functional alkyl ester of methacrylic acid. These carbamate functional alkyl esters are prepared by reacting, for example, a hydroxyalkyl carbamate, such as the reaction product of ammonia and ethylene carbonate or propylene carbonate, with methacrylic anhydride. Other carbamate functional vinyl monomers can include the reaction product of hydroxyethyl methacrylate, isophorone diisocyanate and hydroxypropyl carbamate. Still other carbamate functional vinyl monomers may be used, such as the reaction product of isocyanic acid (HNCO) with a hydroxyl functional acrylic or methacrylic monomer such as hydroxyethyl acrylate, and those carbamate functional vinyl monomers described in U.S. Pat. No. 3,479,328.

Carbamate groups can also be incorporated into the acrylic polymer by a "transcarbamoylation" reaction in which a hydroxyl functional acrylic polymer is reacted with a low molecular weight carbamate derived from an alcohol or a glycol ether. The carbamate groups exchange with the hydroxyl groups yielding the carbamate functional acrylic polymer and the original alcohol or glycol ether.

The low molecular weight carbamate functional material derived from an alcohol or glycol ether is first prepared by reacting the alcohol or glycol ether with urea in the presence of a catalyst such as butyl stannoic acid. Suitable alcohols include lower molecular weight aliphatic, cycloaliphatic and aromatic alcohols, such as methanol, ethanol, propanol, butanol, cyclohexanol, 2-ethylhexanol and 3-methylbutanol. Suitable glycol ethers include ethylene glycol methyl ether and propylene glycol methyl ether. Propylene glycol methyl ether is typically employed.

Also, hydroxyl functional acrylic polymers can be reacted with isocyanic acid yielding pendent carbamate groups. Note that the production of isocyanic acid is disclosed in U.S. Pat. No. 4,364,913. Likewise, hydroxyl functional acrylic polymers can be reacted with urea to give an acrylic polymer with pendent carbamate groups.

Epoxide functional acrylic polymers are typically prepared by polymerizing one or more epoxide functional ethylenically unsaturated monomers, e.g., glycidyl (meth) acrylate, with one or more ethylenically unsaturated monomers that are free of epoxide functionality, e.g., methyl (meth)acrylate, isobornyl (meth)acrylate, butyl (meth) acrylate and styrene. Examples of epoxide functional ethylenically unsaturated monomers that may be used in the preparation of epoxide functional acrylic polymers include, but are not limited to, glycidyl (meth)acrylate, 3,4-epoxycyclohexylmethyl (meth)acrylate, 2-(3,4-epoxycyclohexyl)ethyl (meth)acrylate and allyl glycidyl ether. Examples of ethylenically unsaturated monomers that are free of epoxide functionality include those described above as well as those described in U.S. Pat. No. 5,407,707 at column 2, lines 17 through 56, which disclosure is incorporated herein by reference. In one embodiment of the present invention, the epoxide functional acrylic polymer is prepared from a majority of (meth)acrylate monomers.

Isocyanate functional groups can be incorporated into the acrylic polymer, for example, by reacting an acrylic polyol, such as those described above, with a polyisocyanate using reactant ratios and reaction conditions well known in the art to ensure the desired isocyanate functional groups. Examples of suitable polyisocyanates are those described in U.S. Pat. No. 4,046,729 at column 5, line 26 to column 6, line 28, hereby incorporated by reference The functional group-containing acrylic polymer typically has a Mn ranging from 500 to 30,000 and often from 1000 to 5000. If carbamate functional, the acrylic polymer typically has a calculated carbamate equivalent weight typically within the range of 15 to 150, and usually less than 50, based on equivalents of reactive carbamate groups.

Non-limiting examples of functional group-containing polyester polymers suitable for use in the liquid film-forming compositions can include linear or branched polyesters having hydroxyl, carboxyl and/or carbamate functionality. Such polyester polymers are generally prepared by the polyesterification of a polycarboxylic acid or anhydride thereof with polyols and/or an epoxide using techniques known to those skilled in the art. Usually, the polycarboxylic acids and polyols are aliphatic or aromatic dibasic acids and diols. Transesterification of polycarboxylic acid esters using conventional techniques is also possible.

The polyols which usually are employed in making the polyester (or the polyurethane polymer, as described below) include alkylene glycols, such as ethylene glycol and other diols, such as neopentyl glycol, hydrogenated Bisphenol A, cyclohexanediol, butyl ethyl propane diol, trimethyl pentane diol, cyclohexanedimethanol, caprolactonediol, for example, the reaction product of epsilon-caprolactone and ethylene glycol, hydroxy-alkylated bisphenols, polyether glycols, for example, poly(oxytetramethylene) glycol and the like. Polyols of higher functionality may also be used. Examples include trimethylolpropane, trimethylolethane, pentaerythritol, tris-hydroxyethylisocyanurate and the like. Branched polyols, such as trimethylolpropane, are typically employed in the preparation of the polyester.

The acid component used to prepare the polyester polymer can include, primarily, monomeric carboxylic acids or anhydrides thereof having 2 to 18 carbon atoms per molecule. Among the acids which are useful are cycloaliphatic acids and anhydrides, such as phthalic acid, isophthalic acid, terephthalic acid, tetrahydrophthalic acid, hexahydrophthalic acid, methylhexahydrophthalic acid, 1,3-cyclohexane dicarboxylic acid and 1,4-cyclohexane dicarboxylic acid. Other suitable acids include adipic acid, azelaic acid, sebacic acid, maleic acid, glutaric acid, decanoic diacid, dodecanoic diacid and other dicarboxylic acids of various types. The polyester may include minor amounts of monobasic acids such as benzoic acid, stearic acid, acetic acid and oleic acid. Also, there may be employed higher carboxylic acids, such as trimellitic acid and tricarballylic acid. Where acids are referred to above, it is understood that anhydrides thereof which exist may be used in place of the acid. Also, lower alkyl esters of diacids such as dimethyl glutarate and dimethyl terephthalate can be used. Because it is readily available and low in cost, terephthalic acid is often employed.

Pendent and/or terminal carbamate functional groups may be incorporated into the polyester by first forming a hydroxyalkyl carbamate which can be reacted with the polyacids and polyols used in forming the polyester. The hydroxyalkyl carbamate is condensed with acid functionality on the polyester yielding carbamate functionality. Carbamate functional groups may also be incorporated into the polyester by reacting a hydroxyl functional polyester with a low molecular weight carbamate functional material via a transcarbamoylation process similar to the one described above in connection with the incorporation of carbamate groups into the acrylic polymers or by reacting isocyanic acid with a hydroxyl functional polyester.

Epoxide functional polyesters can be prepared by art-recognized methods, which typically include first preparing a hydroxy functional polyester that is then reacted with epichlorohydrin. Polyesters having hydroxy functionality may be prepared by art-recognized methods, which include reacting carboxylic acids (and/or esters thereof) having acid (or ester) functionalities of at least two (2), and polyols having hydroxy functionalities of at least two (2). As is known to those of ordinary skill in the art, the molar equivalents ratio of carboxylic acid groups to hydroxy groups of the reactants is selected such that the resulting polyester has hydroxy functionality and the desired molecular weight.

Isocyanate functional groups can be incorporated into the polyester polymer by reacting a polyester polyol such as those described above with a polyisocyanate using reactant ratios and reaction conditions such as those well known in the art. Examples of suitable polyisocyanates include those described above with reference to acrylic polymers having isocyanate functional groups.

The functional group-containing polyester polymer typically has a Mn ranging from 500 to 30,000, usually about 1000 to 5000. If carbamate functional, the polyester polymer typically has a calculated carbamate equivalent weight within the range of 15 to 150, usually 20 to 75, based on equivalents of reactive pendent or terminal carbamate groups.

Non-limiting examples of suitable polyurethane polymers having pendent and/or terminal hydroxyl and/or carbamate functional groups include the polymeric reaction products of polyols, which are prepared by reacting the polyester polyols or acrylic polyols, such as those mentioned above, with a polyisocyanate such that the OH/NCO equivalent ratio is greater than 1:1 such that free hydroxyl groups are present in the product. Such reactions employ typical conditions for urethane formation, for example, temperatures of 60° C. to 90° C. and up to ambient pressure, as known to those skilled in the art.

The organic polyisocyanates which can be used to prepare the functional group-containing polyurethane polymer include aliphatic or aromatic polyisocyanates or a mixture of the two. Diisocyanates are often employed, although higher polyisocyanates can be used in place of or in combination with diisocyanates.

Examples of suitable aromatic diisocyanates include 4,4'-diphenylmethane diisocyanate and toluene diisocyanate. Examples of suitable aliphatic diisocyanates include straight chain aliphatic diisocyanates, such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates include 1,2,4-benzene triisocyanate and polymethylene polyphenyl isocyanate.

Terminal and/or pendent carbamate functional groups can be incorporated into the polyurethane by reacting a polyisocyanate with a polyester polyol containing the terminal/pendent carbamate groups. Alternatively, carbamate functional groups can be incorporated into the polyurethane by reacting a polyisocyanate with a polyester polyol and a hydroxyalkyl carbamate or isocyanic acid as separate reactants. Carbamate functional groups can also be incorporated into the polyurethane by reacting a hydroxyl functional polyurethane with a low molecular weight carbamate functional material via a transcarbamoylation process similar to the one described above in connection with the incorporation of carbamate groups into the acrylic polymer.

Isocyanate functional polyurethane polymers can be prepared by reacting polyurethane polyols such as those described above with polyisocyanates such as those described above with reference to the polyurethane polyols. The hydroxyl/isocyanate equivalent ratio is adjusted and reaction conditions selected to obtain the desired isocyanate functional groups.

The polyurethane polymers generally have a Mn ranging from 500 to 20,000 and typically from 1000 to 5000. If carbamate functional, the polyurethane polymer typically has a carbamate equivalent weight within the range of 15 to 150, often within the range of 20 to 75, based on equivalents of reactive pendent or terminal carbamate groups.

Functional group-containing polyether polymer also can be used as a film-forming polymer in the liquid film-forming compositions. Suitable hydroxyl and/or carbamate functional polyether polymers can be prepared by reacting a polyether polyol with urea under reaction conditions well known to those skilled in the art. Most often, the polyether polymer is prepared by a transcarbamoylation reaction similar to the reaction described above in connection with the incorporation of carbamate groups into the acrylic polymers.

Examples of polyether polyols are polyalkylene ether polyols which include those having the following structural formulae (I) and (II):

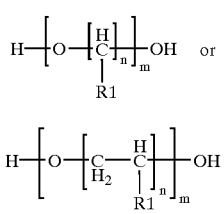

where the substituent $R_1$ is hydrogen or lower alkyl containing from 1 to 5 carbon atoms including mixed substituents, n is typically from 2 to 6, and m is from 8 to 100 or higher. Note that the hydroxyl groups, as shown in structures (II) and (III) above, are terminal to the molecules. Included are poly(oxytetramethylene)glycols, poly(oxytetraethylene)glycols, poly(oxy-1,2-propylene)glycols and poly(oxy-1,2-butylene)glycols.

Also useful are polyether polyols formed from oxyalkylation of various polyols, for example, diols, such as ethylene glycol, 1,6-hexanediol, Bisphenol A and the like, or other higher polyols, such as trimethylolpropane, pentaerythritol and the like. Polyols of higher functionality which can be utilized as indicated can be made, for instance, by oxyalkylation of compounds, such as sucrose or sorbitol. One commonly utilized oxyalkylation method is reaction of a polyol with an alkylene oxide, for example, propylene or ethylene oxide, in the presence of a conventional acidic or basic catalyst as known to those skilled in the art. Typical oxyalkylation reaction conditions may be employed. Typically employed polyethers include those sold under the names TERATHANE® and TERACOL®, available from E. I. Du Pont de Nemours and Company, Inc. and POLYMEG®, available from Q O Chemicals, Inc., a subsidiary of Great Lakes Chemical Corp.

Epoxide functional polyethers can be prepared from a hydroxy functional monomer, e.g., a diol, and an epoxide functional monomer, and/or a monomer having both hydroxy and epoxide functionality. Suitable epoxide functional polyethers include, but are not limited to, those based on 4,4'-isopropylidenediphenol (Bisphenol A), a specific example of which is EPON® RESIN 2002 available commercially from Shell Chemicals.

Suitable functional group-containing polyether polymers generally have a number average molecular weight (Mn) ranging from 500 to 30,000 and usually from 1000 to 5000. If carbamate functional, the polyether polymers have a carbamate equivalent weight of within the range of 15 to 150, typically 25 to 75, based on equivalents of reactive pendent and/or terminal carbamate groups and the solids of the polyether polymer.

It should be understood that the carbamate functional group-containing polymers typically contain residual hydroxyl functional groups which provide additional crosslinking sites. When this is the case, the carbamate functional group-containing polymer (a) generally has a residual hydroxyl value ranging from 10 to 150, usually from 10 to 100; and typically from 10 to 60 (mg KOH per gram).

The crosslinking agent can be any of the crosslinking agents well known in the coatings art, provided that the crosslinking agent has functional groups which are reactive with the functional groups of the film-forming polymer. Suitable crosslinking agents can include aminoplast resins, polycarboxylic acids, polyisocyanates, for example, the isocyanates described above, and mixtures thereof.

The blocked isocyanates suitable for use as the crosslinking agent in the liquid film-forming compositions are known compounds and can be obtained from commercial sources or may be prepared according to published procedures. Upon being heated to cure the powder coating compositions, the isocyanates are unblocked and the isocyanate groups become available to react with the functional groups of the polymer.

Any suitable aliphatic, cycloaliphatic or aromatic alkyl monoalcohol known to those skilled in the art can be used as a blocking agent for the isocyanate. Other suitable blocking agents include oximes and lactams. Non-limiting examples of suitable blocked isocyanate curing agents include those based on isophorone diisocyanate blocked with ε-caprolactam; toluene 2,4-toluene diisocyanate blocked with ε-caprolactam; or phenol-blocked hexamethylene diisocyanate. The blocked isocyanates mentioned immediately above are described in detail in U.S. Pat. No. 4,988,793 at column 3, lines 1 to 36.

Conventional aminoplast crosslinkers, including phenoplast resins can be used as the crosslinking agent in conjunction with hydroxyl and/or carboxyl group-containing polymers. Aminoplast resins typically are the condensation products of the reaction of formaldehyde with an amine or an amide. Most often the amines or amides are melamine, urea or benzoguanamine. Condensates with other amines and amides can be employed, for example, aldehyde condensates or diazines, triazoles, guanidines, guanamines and alkyl and aryl di-substituted derivatives of such compounds including alkyl and aryl-substituted ureas and alkyl and aryl-substituted melamines and benzoguanamines. While the aldehyde most often used is formaldehyde, other aldehydes such a sacetaldehyde, crotonaldehyde, benzaldehyde and furfuryl can be used. The aminoplast contains methylol or similar alkylol groups and often at least a portion of these groups are tehreified by reaction with an alcohol, for example, methanol, ethanol, butanol and mixtures thereof. Non-limiting examples of suitable aminoplast resins include those discussed above.

Epoxide-reactive crosslinking agents can be used in coating compositions comprising an epoxide functional polymer. The epoxide-reactive crosslinking agents can comprise functional groups selected from hydroxyl, thiol, primary amines, secondary amines, acid (e.g. carboxylic acid) and mixtures thereof. Typically, the epoxide reactive curing agent has carboxylic acid groups.

One or more beta-hydroxyalkylamide crosslinking agents may be present in the coating compositions comprising carboxylic acid functional polymer. The beta-hydroxyalkylamide crosslinking agent can be represented by the following general formula IV:

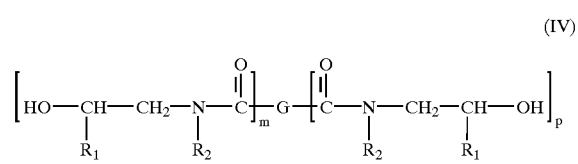

wherein $R_1$ is H or $C_1$–$C_5$ alkyl; $R_2$ is H, $C_1$–$C_5$ alkyl or

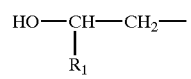

for which $R_1$ is as described above, G is a chemical bond or monovalent or polyvalent organic radical derived from saturated, unsaturated or aromatic hydrocarbon radicals including substituted hydrocarbon radicals containing from 2 to 20 carbon atoms, m equals 1 or 2, p equals 0 to 2, and m+p is at least 2. Typically, G is an alkylene radical —$(CH_2)_x$— where x is equal to 2 to 12, often 4 to 10; m is equal to 1 to 2, p is equal to 0 to 2, and m+p is at least 2, typically greater than 2, and usually within the range from greater than 2 up to and including 4.

The beta-hydroxyalkylamide curing agent represented by general formula (IV) can be prepared by art recognized methods, as described in U.S. Pat. No. 4,937,288 at column 7, lines 6 through 16, which disclosure is incorporated herein by reference.

The crosslinking agent generally can be present in the liquid coating compositions in an amount ranging from 5 to 90 percent by weight, is often present in an amount ranging from 5 to 50 percent by weight, and typically 5 to 25 percent by weight, where weight percentages are based on the weight of total resin solids present in the film-forming composition.

If desired, the liquid coating compositions also can include one or more adjuvant curing agents. The adjuvant curing agent can be any compound having functional groups reactive with the functional groups of the polymer or the crosslinking agent described above. Non-limiting examples of suitable adjuvant curing agents include any of the polyisocyanates, e.g., blocked isocyanates, and aminoplast resins discussed above. When employed, the adjuvant curing agent generally is present in the liquid coating compositions in an amount ranging from 5 to 10 percent by weight, usually from 5 to 20 percent by weight, often from 5 to 30 percent by weight, and typically from 5 to 50 percent by weight based on the total weight of the coating composition.

Also suitable for use as an adjuvant curing agent in the liquid coating compositions are triazine compounds, such as the tricarbamoyl triazine compounds described in detail in U.S. Pat. No. 5,084,541. When used, the triazine curing agent is typically present in the powder coating composition of the present invention in an amount ranging up to about 20 percent by weight, and can be present in an amount ranging from 1 to 20 percent by weight, where percent by weight is based on the total weight of the powder coating composition.

Mixtures of the above-described crosslinking/curing agents also can be used advantageously in the liquid coating compositions of the present invention.

Also, it should be understood that for purposes of the present invention, the curable liquid coating compositions which contain an epoxy group-containing polymer typically also include an epoxide-reactive crosslinking agent, most often an acid functional crosslinking agent such as those described above. Typically, a secondary hydroxyl group is generated upon reaction of each epoxy functional group with a functional group of the epoxide-reactive crosslinking agent. These secondary hydroxyl groups are then available for reaction with a hydroxyl-reactive adjuvant crosslinking agent such as an aminoplast-based crosslinking agent or a blocked isocyanate crosslinking agent.

In one embodiment of the present invention, the non-electrophoretic coating composition comprises a liquid film-forming compositin comprising a hydroxyl functional group-containing polyester polymer in conjunction with an aminoplast crosslinking agent.

Suitable resinous binder systems can include organic solvent-based materials, for example, those described in U.S. Pat. No. 4,220,679, as well as water-based coating compositions, for example, those described in U.S. Pat. Nos. 4,403,003; 4,147,679; and 5,071,904.

Additionally, the liquid non-electrophoretic coating compositions can contain pigments of various types as colorants. Suitable metallic pigments include aluminum flake, bronze flake, copper flake and the like. Other examples of suitable pigments include mica, iron oxides, lead oxides, carbon black, titanium dioxide, talc, as well as a variety of color pigments.

Other optional ingredients include those which are well known in the art of surface coatings and include inorganic microparticles such as silica, for enhanced scratch and mar resistance, surfactants, flow control agents, thixotropic agents, fillers, anti-gassing agents, organic co-solvents, catalysts and other suitable adjuvants.

As mentioned above, the liquid film-forming compositions can be applied by any of the conventional coating techniques, such as brushing, spraying, dipping or flowing, but they are most often spray-applied. The usual spray techniques and equipment for air spraying, airless spraying and electrostatic spraying can be used.

The liquid film-forming compositions are typically applied such that a cured coating having a film thickness ranging from 0.5 to 4 mils (12.5 to 100 micrometers) is formed on at least one major surface of the electrocoated blank as it passes through the coating station (4).

Powder coating compositions suitable for use as the second, non-electrophoretic coating composition in the method of the present invention can be any of the wide variety of powder coating compositions known in the art. Suitable powder coating compositions comprise a resinous binder system which typically is based on a solid particulate mixture of a functional group-containing film-forming polymer and a suitable crosslinking agent reactive with the functionality of the polymer.

Examples of curable powder coating compositions useful in the method of the present invention include, but are not limited to, powder coating compositions comprising epoxide functional polymer and epoxide reactive crosslinking agent, for example as described in U.S. Pat. Nos. 5,407,707, 5,663,240 and 5,710,214; powder coating compositions comprising carboxylic acid functional polymer and beta-hydroxyalkylamide functional crosslinking agent, for example as described in U.S. Pat. Nos. 4,801,680, 4,889,890, 4,937,288, 5,098,955, 5,202,382 and 5,214,101; and powder coating compositions comprising hydroxy functional polymer and capped isocyanate functional crosslinking agent, for example as described U.S. Pat. Nos. 4,997,900, 5,439,896, 5,508,337, 5,510,444, 5,554,692, 5,621,064 and 5,777,061. The disclosures of these cited United States Patents are incorporated herein by reference in their entirety.

As used herein and in the claims, by "polymer," e.g., epoxide functional polymer, is meant oligomeric and/or polymeric species, and homopolymers and/or copolymers.

Typical drying (or curing) temperatures of suitable liquid coating compositions range from 140° C. to 260° C. (300° F. to 500° F.). Typical curing temperatures for powder coating compositions can range from 140° C. to 430° C. (300° F. to 800° F.). The second drying station (5) can comprise any suitable coating line drying or curing oven as are well known in the art, as well as infrared curing means, as discussed above with reference to the first drying station (2).

Moreover, it should be understood that the non-electrophoretic coating may be applied to the electrocoated blank in as one coating composition, or, alternatively, the non-electrophoretic coating can be applied as a multi-layer composite coating. For example, a pigmented liquid first film-forming coating composition as described in detail above can be applied to at least one major surface of the electrocoated blank, followed by a subsequent application of a either a transparent or non-pigmented (i.e., "clear") liquid or powder second coating composition. Likewise, a pigmented powder coating composition can be applied to at least one surface of the electrocoated blank, with subsequent application of a transparent liquid or powder coating composition. In such cases, the coating station (4) can comprise multiple coating application stations, for example a liquid spray booth in line with a powder spray booth, or vice versa. These coating application stations can also include a drying station for drying (or curing) the first non-electrophoretic coating prior to application of the second non-electrophoretic coating. Alternatively, the second non-electrophoretic coating can be applied directly to the first non-electrophoretic coating and the two coatings can be dried/cured simultaneously.

The present invention is also directed to a process for forming a multi-composite coating on a pre-sheared, electroconductive, flat blank having two major surfaces and sheared edges. In this embodiment the blank is conveyed to a first electrodeposition bath (1) located on a coating line (A). Where a first aqueous electrodepositable coating composition is applied to both major surfaces and the sheared edges of the blank as it passes through the first electrodeposition bath (1). The blank serves as an electrode in an electrical circuit comprising the electrode and a counter-electrode immersed in the aqueous electrodepositable coating composition, the composition being deposited onto both major surfaces and the sheared edges of the blank as a substantially continuous electroconductive coating as electric current is passed between the electrodes. Optionally, the coated blank is conveyed from the first electrodeposition bath (1) to a first drying station (2) located on the coating line (A) where the electroconductive coating is dried as it passes through the first drying station (2). The coated blank is then conveyed to a second electrodeposition bath (3) located on the coating line (A) where a second electrodepositable coating composition is applied to the coated blank as it passes through the second electrodeposition bath (3). The blank serves as an electrode in an electrical circuit comprising the electrode and a counter-electrode immersed in the second aqueous electrodepositable coating composition and the composition is deposited onto one of the major surfaces of the coated blank as a substantially continuous electrically insulating coating as electric current is passed between the electrodes. The coated blank is then conveyed to a second drying station (5) located on the coating line (A); the electrically insulating coating is dried as the blank of step (6) passes through the second drying station (5).

It should be understood, that the first drying station (2) and the second drying station (5) can be the same or different drying systems located in the coating line (A). Likewise, if the first drying station (2) and the second drying station (5) are the same drying system, the shear (7A) and the shear (7B) can represent the same shear apparatus.

In the method described immediately above, electrodeposition bath (1) comprises an electrodepositable coating composition which forms an electroconductive coating on both major surfaces and the sheared edges of the blank. This electrodepositable coating composition can be an anionic composition or, as is preferred, a cationic composition. The electrodepositable coating composition from which the electroconductive coating is electrodeposited onto both surfaces of the blank can be a substantially unpigmented coating composition (i.e., a clearcoat composition) or a pigmented coating composition.

In one embodiment, the electrodepositable coating composition from which the electroconductive coating is deposited onto both surfaces of the blank comprises (a) an electrodepositable ionic resin, and (b) one or more electrically conductive pigments. Non-limiting examples of electrodepositable ionic resins suitable for use in the electrodepositable coating composition include the anionic and cationic film-forming polymers described in detail above, as well as the corresponding curing agents for such ionic polymers.

The electrodepositable compositions can further comprise one or more electroconductive pigments to render the resultant coating electroconductive. Suitable electroconductive pigments include electrically conductive carbon black pigments. Generally the carbon blacks can be any one or a blend of carbon blacks ranging from those that are known as higher conductive carbon blacks, i.e. those with a BET surface area greater than 500 $m^2$/gram and DBP adsorption number (determined in accordance with ASTM D2414-93) of 200 to 600 ml/100 g. to those with lower DBP numbers on the order of 30 to 120 ml/100 gram such as those with DBP numbers of 40 to 80 ml/100 grams.

Examples of commercially available electroconductive carbon blacks include Cabot Monarch™ 1300, Cabot XC-72R, Black Pearls 2000 and Vulcan XC 72 sold by Cabot Corporation; Acheson Electrodag™ 230 sold by Acheson Colloids Co.; Columbian Raven™ 3500 sold by Columbian Carbon Co.; and Printex™ XE 2, Printex 200, Printex L and Printex L6 sold by DeGussa Corporation, Pigments Group. Suitable carbon blacks are also described in U.S. Pat No. 5,733,962.

Also, electrically conductive silica pigments may be used. Examples include AEROSIL 200 sold by Japan Aerosil Co., Ltd., and SYLOID® 161, SYLOID® 244, SYLOID® 308, SYLOID® 404 and SYLOID® 978 all available from Fuji Davison Co., Ltd.

Other electrically conductive pigments can be used, for example, metal powders such as aluminum, copper or special steel, molybdenum disulphide, iron oxide, e.g., black iron oxide, antimony-doped titanium dioxide and nickel doped titanium dioxide.

Also useful are particles coated with metals such as cobalt, copper, nickel, iron, tin, zinc, and combinations of thereof. Suitable particles which can be coated with the aforementioned metals include alumina, aluminum, aromatic polyester, boron nitride, chromium, graphite, iron, molydenum, neodymim/iron/boron, samarium cobalt, silicon carbide, stainless steel, titanium diboride, tungsten, tungsten carbide, and zirconia particles. Such metal-coated particles are commercially available from Advanced Ceramics Corp.

Other metal-coated particles which may be used advantageously in the electrodepositable coating composition from which the conductive coating is deposited include ceramic microballoons, chopped glass fibers, graphite powder and flake, boron nitride, mica flake, copper powder and flake, nickel powder and flake, aluminum coated with metals such as carbon, copper, nickel, palladium, silicon, silver and titanium coatings. These particles are typically metal-coated using fluidized bed chemical vacuum deposition techniques. Such metal-coated particles are commercially available from Powdermet, Inc.

Mixtures of different electroconductive pigments can be used.

The conductive pigment is present in the electrodepositable coating composition in an amount sufficient to provide a conductive coating having a sufficiently low specific resistance such that a second electrodepositable coating may be formed over the conductive coating. The amount of electroconductive pigment in the electrodepositable composition can vary depending on the particular type of pigment that is used, but the level needs to be effective to provide an electrodeposited coating with a conductivity of greater than or equal to $10^{-12}$ ohms/centimeter, more typically greater than or equal to $10^{-10}$ ohms/centimeter, and usually greater than or equal to $10^{-6}$ ohms/centimeter.

In other words, the conductive pigment typically is present in the first electrodepositable coating composition in an amount sufficient to provide an at least partially dried (or cured) coating having a specific resistance of less than $10^{10}$, typically ranging from $10^2$ to $10^{10}$ Ohms centimeter, often from $10^3$ to $10^8$ Ohms centimeter, usually from $10^4$ to $10^6$ Ohms centimeter.

As discussed above, the electrodepositable coating composition typically also contains other pigments to provide corrosion resistance, hiding, or as fillers and additives such surfactants, flow additives and crater control agents.

In the method of the present invention, once the conductive first coating has been applied to the blank, the electrocoated blank optionally is conveyed from the first electrodeposition bath (2) to a first drying station (2) located on the coating line (A) for drying the electroconductive coating as it passes through the first drying station (2). Typically, the electroconductive coating is dried (i.e., cured) at a temperature ranging from 82° C. to 426° C., often from 150° C. to 275° C. for a period of time ranging from 60 to 1200 seconds.

The first electrodepositable coating composition is applied under conditions such that a substantially continuous conductive coating having a dried film-thickness typically ranging from 0.1 to 0.4 mils (2.54 to 10.16 micrometers), often from 0.15 to 0.25 mils (3.81 to 6.35 micrometers) is formed over both major surfaces of the blank.

In an alternative embodiment, the conductive coating is not dried or cured and the second electrodepositable coating composition is applied directly to undried coating on one major surface of the blank. This is generally referred to as a wet-on-wet ("WOW") application. A wet-on-wet application is typically used where the first electrodepositable coating is a transparent or clear coating which is substantially free of pigment.

The coated blank is conveyed to a second electrodeposition bath (3) for application of second electrodepositable coating composition to form a substantially continuous electrically insulating coating over one of the major surfaces of the coated blank. The electrodepositable coating compositions discussed in detail above can be used.

As mentioned above, the blank having an electroconductive coating applied to both major surfaces is immersed in the second electrodepositable coating compositions and serves as an electrode, preferable a cathode, in an electrical circuit. The counter-electrode is placed in very close proximity (that is, an interelectrode distance ranging from 2.5 to 25 centimeters) to the major surface to be coated with the second electrodepositable coating composition. When current is impressed between the two electrodes, a substantially continuous insulating coating is deposited on the major surface in close proximity to the counter-electrode.

Generally, application of the second electrodepositable coating composition to only one major surface of the coated metal blank is controlled by limiting the "throwpower" of the second electrodepositable composition. By the term "throwpower" is meant the ability of an electrodepositable coating to apply to or "wrap around" to recessed and shielded areas of a part or sheet of metal.

With reference to the above-described process, it should be understood that the second electrodepositable coating composition can "wrap around" the blank, depositing upon the edges and a portion of the major surface which is not in close proximity to the counter-electrode (i.e., "the opposite major surface"). However, a substantially continuous insulating coating is not formed upon the opposite major surface.

The coated blank is then conveyed to a second drying station (5) located on the coating line (A) where the electrically insulating coating is dried as the coated blank passes through the second drying station (5). Drying or curing conditions are as described above.

In an alternative embodiment of the present invention, the pre-sheared, electroconductive flat blank having two major surfaces and sheared edges is conveyed directly to the second electrodeposition bath (3) where an aqueous electrodepositable coating composition is applied to only one major surface and the sheared edges of the blank as the blank passes through the electrodeposition bath (3). It should be understood that the blank can be formed from a coiled metal substrate that is first supplied to a shear located prior to the entrance of electrodeposition bath (3). The blank formed from the coiled metal substrate then can be conveyed directly to the electrodeposition bath (3) for application of the electrodepositable coating composition onto one major surface of the blank. Coating conditions are as described above. The electrocoated blank is then conveyed to the second drying station (5) where the electrodeposited coating is dried as the coated blank passes through the second drying station (5). Drying or curing conditions are as described above for the electrically insulating electrodepositable coating composition.

The present invention also is directed to various methods of forming coated blanks from a continuous metal strip. The blanks can be formed from the metal strip initially, and the blanks then can be coated using the various coating methods as discussed above. Alternatively, the continuous metal strip first can be coated using the various electrocoating steps described above with regard to the pre-sheared blanks, and thereafter the blanks are formed from the coated metal strip.

In one embodiment of the present invention, a continuous metal strip having two major surfaces is supplied to the entrance of an electrodeposition bath (1) located on a coating line (A). An aqueous electrodepositable coating composition, such as those described in detail above, is applied to both major surfaces of the metal strip as it passes through the electrodeposition bath (1), the metal strip serving as an electrode in an electrical circuit comprising the electrode and a counter-electrode immersed in the aqueous electrodepositable coating composition. The electrodepositable coating composition is deposited onto both major surfaces of the metal strip as a substantially continuous coating as electric current is passed between the electrodes.

Exemplary of an apparatus and electrodeposition bath suitable for electrocoating a continuous metal strip (or coiled metal strip) is the apparatus described in copending U.S. patent application Ser. No. 09/798,103, filed concurrently herewith and incorporated herein by reference. The apparatus is described briefly as follows.

Figure 2:
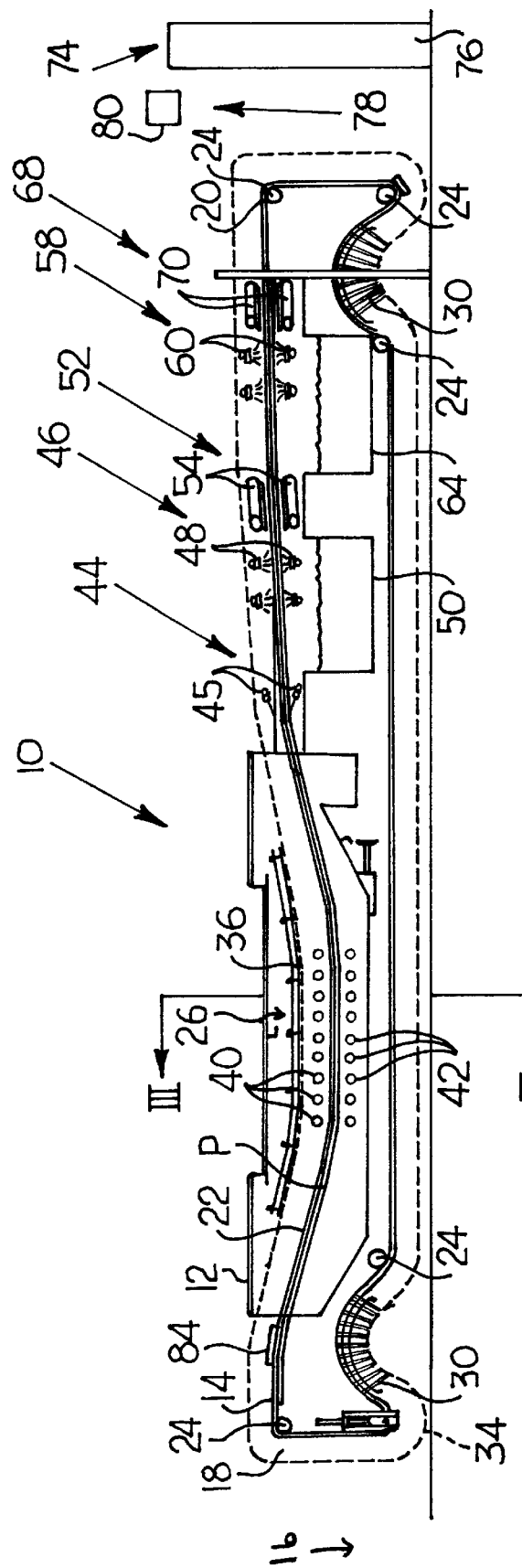
FIG. 2 is a side, schematic view (not to scale) of an exemplary electrocoating apparatus incorporating features of the invention.

With reference to FIG. 2, a suitable electrocoating apparatus 10 includes an electrocoat tank 12 with a conveyor 14 extending at least partly into the interior of the tank 12. The electrocoat tank 12 may be of any conventional type and size to accommodate the substrates being coated for example, those described in U.S. Pat. Nos. 4,333,807 and 4,259,163. The tank 12 is configured to contain an electrodepositable coating composition such as the compositions described in detail above.

The interior of the tank 12 can be in flow communication with a conventional recycling system, to prevent solids in the coating composition from settling to the bottom of the tank 12; a conventional heat exchanger, such as an electric heater, in any conventional manner, to control the temperature of the coating composition in the tank 12; and/or a conventional ultrafiltration system to remove soluble impurities from the coating composition and to recycle the filtered material back into the electrodeposition tank 12.

As shown on the left side of FIG. 2, a load area 16 is defined adjacent one end of the conveyor 14. The load area has sufficient free space to permit unhindered loading of substrates to be coated, whether in blank or coil form, onto the conveyor 14 as described in more detail below.

The conveyor 14 has an inlet end 18 and an outlet end 20. The conveyor 14 may be of any convenient type, such as, but not limited to, a belt conveyor, a chain conveyor, a platform conveyor, and the like. However, the conveyor 14 is typically composed primarily of non-conductive material so as not to attract electrodepositable coating material during the coating process. As will be appreciated by one of ordinary skill in the art, the exemplary endless conveyor 14 shown in FIG. 2 provides an upper portion or leg to transport substrates during the coating process and a lower or return portion. As shown in FIGS. 2 and 3, the conveyor 14 may be formed by a plurality, e.g., 5, of spaced, non-conductive chains 22 each movably mounted on rotatable wheels or sprockets 24 and supported on guide rails to define a conveyor path P into and out of the electrocoat tank 12. To help maintain a substrate on the conveyor 14 during the coating process, a plurality of holding devices, for example, magnets, can be carried on the conveyor 14.

In order to electrocoat a substrate, the substrate should be under the influence of an applied electric potential. Therefore, a connecting system 26 is provided to connect the substrate to be coated to an electrical source (not shown) during the coating process. In the exemplary embodiment shown in FIGS. 2–4, the connecting system 26 includes a plurality of spaced, electrically conductive supports 28 (FIG. 4) carried on the chains 22 and extending above the top or outer surface of the conveyor 14 to support and contact a metal substrate during the coating process as described below.

A timing shaft (not shown) can be attached to the sprockets 24 so that the chains 22 move at substantially the same speed to maintain the supports 28 in rows. Examples of suitable supports 28 for the practice of the invention include K-1 electrical connectors commercially available from 31 Engineering of Evansville, Ind. Alternatively, the supports 28 on adjacent chains 22 can be offset from one another, if desired.

In order to provide the electric potential, the supports 28 are connected to one or more electrically conductive connectors. For example, the connectors can be solid, metal, electrically conductive grounding bars 30 (FIGS. 3 and 4), each connected to one or more of the supports 28. The grounding bars 30 can be carried on the chains 22 to move when the chains 22 move. For example, one grounding bar 30 can be connected to each of the adjacent supports 28 of a row as described above. Each grounding bar 30 may have an outer end 32, e.g., extending above the outer surface of the conveyor 14. So as not to clutter the figures, only a portion of the total number of grounding bars 30 are shown in FIG. 2. The outer ends 32 of the grounding bars 30 define a path 34 shown in dashed lines in FIG. 3 as the conveyor 14 moves. As described below, the grounding bars 30 act to place one or more selected supports 28 in electrical contact with the electrical power to apply an electric potential to a substrate carried on the selected supports 28 when the selected supports 28 supporting the substrate are adjacent to or in the tank 12, particularly in a coating region of the tank 12, as described in more detail below.

The grounding bars 30, e.g., the outer ends 32 of the grounding bars 30, are configured to contact an electrical bus bar 36 mounted adjacent, e.g., above, the electrocoat tank 12. As shown in FIG. 2, the bus bar 36 is shaped, such that, as described in more detail below, the outer end 32 of a grounding bar 30 contacts the bus bar 36 when the supports 28 to which the grounding bar 30 is connected are positioned in or adjacent the electrocoating composition in the tank 12 but loses contact with the bus bar 30 when the supports 28 connected to the grounding bar 30 pass out of the electrocoating composition or out of the coating region of the tank 12.

As will be appreciated by one of ordinary skill in the art, the invention is not limited to connecting systems having the grounding bar and bus bar structure described above. For example, the connecting system 26 could be formed by a plurality of electrically conductive driven contact wheels forming part of the conveyor or by opposed contact clamps configured to engage the substrate when located in the tank 12. Examples of suitable alternative connecting systems are disclosed in U.S. Pat. Nos. 4,385,967 and 4,755,271, herein incorporated by reference.

At least one and typically a plurality of first electrodes 40 are located in the electrocoat tank 12 on one side of the conveyor path, e.g., above the conveyor path as shown in FIG. 2. The first electrodes 40 can be located less than 10" (25 cm) from the top of the conveyor 14, i.e., the side of the upper leg of the conveyor 14 closest the first electrodes 40, are often less than 5" (12.5 cm) from the top of the conveyor 14, and usually are less than 1" to 2" (2.5 cm to 5 cm) from the top of the conveyor 14. The first electrodes 40 can be attached to or carried on a vertically movable support (not shown) such that the distance between one or more of the first electrodes 40 and the top of the conveyor 14 can be adjusted. The first electrodes 40 are disposed in the tank 12 transverse to the conveyor path. The electrodes 40 are connected to a power source (not shown) in any suitable manner, such as by cables. The electrodes 40 are made of electrically conductive material, such as copper, and may be configured as copper bars extending across the width of the conveyor 14 in the tank 12.

As described more fully below, one or more optional second electrodes 42 can be located in the electrocoat tank 12 below the upper leg of the conveyor path P, e.g., opposite the first electrodes 40. If present, the second electrodes 42 are typically located 1" to 10" (2.5 cm to 25 cm) from the bottom of the upper leg of the conveyor 14. The second electrodes 42 also can be attached to or carried on one or more movable supports such that the distance between one or more of the second electrodes 42 and the bottom of the upper conveyor 14 portion can be adjusted.

An exit rinse station 44 can be located at or near a discharge end of the tank 12. The rinse station 44 can comprise one or more spray applicators 45 in flow communication with a source of rinsing fluid, e.g., one applicator located above the conveyor path P of the upper portion of the conveyor 14 and one applicator 45 below the upper portion of the conveyor 14. For example, the spray applicators 45 can be in flow communication with the ultrafiltration system to provide permeate to the rinse applicators 45. Excess rinse fluid can be directed into the tank 12, e.g., by a sloped shelf located under the rinse applicators 45 and sloping toward the tank 12.

A first rinse station 46 is located downstream of the electrocoat tank 12, e.g., downstream of the exit rinse station 44. The first rinse station 46 can comprise any conventional rinse applicators but, in the exemplary embodiment under discussion, includes one or more spray applicators 48 located above and in flow communication with a first rinse tank 50, e.g., by a pump and conduits to supply rinse fluid from the first rinse tank 50 to the spray applicators 48. The first rinse tank 50 may also be in flow communication with a conventional recirculation system having a recirculation pump (not shown). As shown in FIG. 2, one or more of the applicators 48 can be located above the upper portion of the conveyor 14 (and directed toward the outer surface of the conveyor 14) and one or more other of the applicators 48 can be located below the upper portion of the conveyor 14 (and directed toward the inner surface of the conveyor 14).

A first drain station 52 is located downstream of the first rinse station 46 to remove at least some of the excess rinse composition from the surfaces of the substrate being coated. The first drain station 52 can include one or more fluid removal devices, such as an air knife or squeegee rolls. In the exemplary embodiment shown in FIG. 2, the first drain station 52 includes two air knives 54, with one air knife 54 located above the conveyor path and another air knife 54 located below the conveyor path. The air knives 54 are configured to direct or blow at least some of the excess rinse composition back into the first rinse tank 46.

A second rinse station 58 typically is located downstream of the first rinse station 46. The second rinse station 58 can comprise any conventional rinsing applicators but, in the exemplary embodiment under discussion, includes one or more spray applicators 60 located above and in flow communication with a second rinse tank 64, e.g., by a pump and conduits to supply rinse fluid from the second rinse tank 64 to the spray applicators 60 in similar manner as in the first rinse station 46. The second rinse tank 64 may be in flow communication with a conventional recirculation system having a recirculation pump (not shown).

A second drain station 68 is located downstream of the second rinse station 58 to remove at least some of the excess rinse composition from the substrate. The second drain station 68 includes at least one fluid removal device, such as one air knife 70 located above the conveyor path and another air knife 70 located below the conveyor path. The air knives 70 are configured to direct at least some of the excess rinse composition back into the second rinse tank 64.

A drying station 74 having a dryer 76 is located downstream of the second rinse tank 64 to dry and/or cure the applied coating. As used herein, the term "dry" means the almost complete absence of water from the coating and the term "cure" means that the majority, preferably all, of any crosslinkable components of the applied coating material are crosslinked. The dryer 76 can include any conventional drying oven or drying apparatus, such as an infra-red radiation oven, an electric oven, a gas oven, a hot air convection oven, and the like. In one exemplary embodiment, the dryer 76 is a high velocity gas oven commercially available from Gruenwald Corp.

The coated metal strip is then conveyed to a drying station (2) located on the coating line (A) where the electrodeposited coating is dried as the coated metal strip passes through the drying station (2). Optionally, the coated metal strip is then conveyed to a recoiling station located off the coating line and recoiled to await further processing. The coated metal strip is then conveyed (either from the drying station (2) or from the off-line recoiling station) to the entrance of a metal shear (7A) located at an exit end of the drying station (2) and the coated strip is sheared to form coated blanks as the coated metal strip passes through the shear (7A).

It should be understood that the blanks formed by the method described immediately above typically can have sheared edges devoid of any protective coating. Hence, the method optionally can comprise the additional steps of applying corrosion inhibitive chemicals to the sheared edges. Examples of suitable corrosion inhibitors can include, for example, yttrium acetate.

In another embodiment of the present invention, a continuous metal strip having two major surfaces is supplied to the entrance of an electrodeposition bath (1) located on a coating line (A). A first electrodepositable coating composition, such as any of the electrodepositable coating compositions which provide an electroconductive coating described in detail above, is applied to both major surfaces of the metal strip as it passes through the electrodeposition bath (1). The metal strip serves as an electrode in an electrical circuit comprising the electrode and an counter-electrode immersed in the first aqueous electrodepositable coating composition, the composition being deposited onto both major surfaces of the metal strip as a substantially continuous electrically conductive coating as electric current is passed between the electrodes. Optionally, the coated metal strip is conveyed to a first drying station (2) located in the coating line (A) and the electrically conductive coating is dried on the metal strip as it passes through the first drying station (2). Optionally, the metal strip coated with the electrically conductive coating can be transferred to a recoiling station located off-line to await further processing.

The metal strip coated with the electrically conductive coating is conveyed (either from the first drying station (2) or from the off-line recoiling station) to an entrance of a shear (7A) located adjacent an exit end of the drying station (2). The coated metal strip is then sheared to form a coated blank as it passes through the shear (7A).

The coated blank is then conveyed to a second electrodeposition bath (3) for application of a second aqueous electrodepositable coating composition, such as any of the electrodepositable coating compositions described above, to one of the major surfaces of the coated blank as it passes through the second electrodeposition bath (3). The blank serves as an electrode in an electrical circuit comprising the electrode and a counter-electrode immersed in the second aqueous electrodepositable coating composition. The composition is deposited onto one major surface of the coated blank as a substantially continuous electrically insulating coating as electric current is passed between the electrodes.

The electrically insulating coating is electrodeposited onto one major surface of the blank as described above by positioning the counter-electrodes in close proximity to the major surface to be coated. Likewise, it should be understood that the electrically insulating coating typically "wraps around" the blank, coating the edges and a portion of the opposite major surface as described above.

The coated blank is then conveyed to a second drying station (5) located on the coating line (A), and the electrically insulating coating is dried as the blank passes through the drying station (5).

In another embodiment, the continuous metal strip is supplied to an entrance of an electrodeposition bath (1) located on the coating line (A) and a first electrodepositable coating composition is applied as described above to both major surfaces of the metal strip as it passes through the bath to form a continuous electrically conductive coating on both major surfaces of the metal strip. Optionally, the coated metal strip is conveyed to a first drying station (2) and the electrically conductive coating is dried as the metal strip passes through the drying station (2). Upon exiting the drying station (2), the coated metal strip can be transferred to a recoiling station located off-line to await further processing. Alternatively, the coated metal strip is conveyed (either directly from the electrodeposition bath (1) for a WOW application, from the drying station (2), or from the off-line recoiling station) to a second electrodeposition bath (3) located on the coating line (A). A second electrodepositable coating composition is applied as described above to one of the major surfaces of the coated metal strip as it passes through the second electrodeposition bath (3) to form a substantially continuous electrically insulating coating on one major surface of the coated metal strip.

The coated metal strip is then conveyed to a second drying station (5) located in the coating line (A) and the coated metal strip is dried as it passes through the second drying station (5). Optionally, the coated metal strip is then transferred to a recoiling station located off line to await further processing. Alternatively, the coated metal strip is conveyed (either from the second drying station (5) or from the off-line recoiling station) to an entrance of a shear (7A) or (7B) located at an exit end of the drying station (2) or (5). The coated metal strip is sheared to form coated blanks as the metal strip passes through the shear (7A) or (7B).

In an alternative embodiment of the present invention, the coiled metal strip is conveyed directly to the second electrodeposition bath (3) for application of an electrodeposition coating composition to only one major surface of the metal strip as the metal strip passes through the electrodeposition bath (3). The metal strip is immersed in the second electrodepositable coating composition and serves as an electrode, preferable a cathode, in an electrical circuit. The counter-electrode is placed in very close proximity (that is, an interelectrode distance ranging from 2.5 to 25 centimeters) to the major surface to be coated with the second electrodepositable coating composition. When current is impressed between the two electrodes, a substantially continuous insulating coating is deposited on the major surface in close proximity to the counter-electrode. Application of the second electrodepositable coating composition to only one major surface of the metal strip is controlled by limiting the "throwpower" of the second electrodepositable composition. Also, it should be understood that the second electrodepositable coating composition can wrap around to the major surface of the metal strip which is not to be coated, provided that a substantially continuous coating is not formed thereon.

The coated metal strip is then conveyed to the second drying station (5) where the coating on one major surface is dried as the metal strip pass through the second drying station (5). Optionally, the coated metal strip can be conveyed to a recoiling station located off the coating line (A) and recoiled to await further processing. The coated metal strip can be conveyed directly from the second drying station (5) or, optionally, from the recoiling station, to an entrance of a shear located at an exit end of the drying station, for shearing the coated metal strip to form a flat coated blank as the strip passes through the shear (7B).

As aforementioned, metal blanks coated by the methods of the present invention can be "post-formed" into parts to be assembled into various end-products, for example, front, side and back panels for appliances such as washers, dryers and refrigerators. The post-forming processes (e.g., punching and bending) require that the coatings (including the multi-layer composite coatings) which are applied to the blanks be particularly adherent and flexible.

In one embodiment of the present invention, the electrodepositable coating is a post-formable coating capable of providing a T-bend flexibility rating of less than 6T, typically ranging from 0T to 6T, and often ranging from 2T to 4T as determined in accordance with ASTM-D4145. In another embodiment of the present invention, the electrodepositable coating is a post-formable multi-layer composite coating capable of providing a T-bend flexibility rating of less than 6T, typically ranging from 0T to 6 T, and often from 2T to 4T as determined in accordance with ASTM-D4145.

Illustrating the invention are the following examples which are not to be considered as limiting the invention to their details. Unless otherwise indicated, all parts and percentages in the following examples, as well as throughout the specification, are by weight.

EXAMPLES

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Examples A through B

The following Examples A and B describe the preparation of cationic electrodepositable conductive primer compositions useful in the processes of the present invention. Example A describes the preparation of pigmented electrodepositable conductive primer coating composition and Example B describes the preparation of an unpigmented electrodepositable conductive primer coating composition. Each conductive primer composition is in the form of an electrodeposition bath. Each of the electrodeposition bath compositions was prepared by blending under mild agitation the following ingredients:

| Ingredients | Example A (parts by weight) | Example B (parts by weight) |
|---|---|---|
| CR661[1] | 1326.33 | 1500.00 |
| CP639[2] | 445.82 | — |
| Deionized Water | 2027.85 | 2100.00 |

[1]Electrocoating resin component available from PPG Industries, Inc.
[2]Electrocoating pigment paste component available from PPG Industries, Inc.

The electrodeposition bath composition of Example A had a pigment-to-binder ratio ("p/b") of 0.15 and a total solids content of 17.0 percent based on total weight of the respective electrodeposition bath compositions. The electrodeposition bath composition of Example B had a total solids content of 15.0 percent based on total weight of the electrodeposition bath.

Example 1

This example describes the preparation of an electrodepositable top coating composition for application over conductive electrodepositable primer compositions in the processes of the present invention. The electrodepositable top coating composition is in the form of an electrodeposition bath composition. The electrodeposition bath composition was prepared by blending under mild agitation the following ingredients:

| INGREDIENTS | PARTS BY WEIGHT (grams) |
| --- | --- |
| CR940B[1] | 1352.07 |
| CP436[2] | 375.88 |
| Deionized water | 2072.05 |

[1]Electrocoating resin component available from PPG Industries, Inc.
[2]Electrocoating pigment paste component available from PPG Industries, Inc.

The resulting electrodepositable top coating bath composition had a total solids content of 15.0 percent based on total bath weight and a p/b of 0.53.

Example 2

This example describes the powder top coating composition for application over conductive electrodepositable primer compositions in the processes of the present invention. The powder top coating composition is a dry powder coating composition, PCT80139W, commercially available from PPG Industries, Inc. of Pittsburgh, Pa.

Comparative Example 3

This comparative example describes application of a conventional liquid coating system. The liquid coating system was comprised of a liquid urethane primer coating, APPPY 3020, with subsequent application of a conventional liquid polyester topcoat, APTW 3952. Both the APPPY 3020 and the APTW 3952 are commercially available from PPG Industries, Inc. of Pittsburgh, Pa. The conventional liquid coating compositions were used as the control series to be evaluated versus the electrodepositable coating compositions applied by the methods of the present invention.

Test Panel Preparation

Each of the above-described electrodepositable conductive primer bath compositions (Examples 1 and 2) was applied to cold rolled steel ("CRS") test panels, which had been pretreated with CF710 CS20®, a zinc phosphate pretreatment composition commercially available from PPG Industries, Inc. The pigmented primer coating of Example A was electrodeposited at 15 seconds/1.75 Amps/175 volts onto the zinc phosphated CRS, the non-pigmented coating Example B was electrodeposited at 60 seconds/1.0 Amps/100 Volts. Each primer coating composition was electrodeposited at film builds ranging from 0.15 mils to 0.35 mils (3.75 to 8.75 micrometers) dry film thickness.

The electrocoated test panels for Example A were baked at a temperature of 400° F. (204° C.) for 20 minutes to cure the conductive primer thereon. The electrocoated test panels for Example B were then "flashed" for 5 minutes at room temperature to allow dehydration to occur.

The electrodepositable top coating composition of Example 1 was then applied to the primed test panels prepared as described immediately above. For Example A, (cured conductive primer), and Example B, (air-dried conductive clear coat), the electrodepositable top coating composition of Example 1 was electrodeposited at 90 seconds/1.2 Amps/125 Volts. The top coated panels thus prepared were then baked at a temperature of 350° F. (177° C.) for 20 minutes to cure the electrodepositable top coating composition. The cured top coating compositions had a dry film thickness ranging from 1.20 to 1.4 mils (30 to 35 micrometers).

The powder top coating composition of Example 2 was then applied to the primed test panels. For Example A (cured conductive primer), and Example B (air-dried conductive clear coat), the powder topcoat composition of Example 2 was applied by electrostatic spray. The top coated panels thus prepared were then baked at a temperature of 400° F. (204° C.) for 10 minutes to cure the powder topcoat. The cured powder topcoat composition had a dry film thickness ranging from 1.20 to 2.20 mils (30 to 55 micrometers).

With respect to the conventional liquid coating system of Example 3, the primer APPY 3020 was roll applied to zinc phosphate treated galvanized steel substrate, then cured at a temperature of 400° F. (204° C.) for 10 minutes. A dry film thickness of 0.2 mils (5 micrometers) was achieved. The liquid topcoat was then spray applied to the primed substrate and cured at a temperature of 400° F. (204° C.) for 10 minutes to form a topcoat having a dry film thickness of 0.8 mils (20.3 micrometers).

The test panels thus prepared were evaluated for corrosion resistance by salt spray testing in accordance with ASTM B17; detergent resistance in accordance with ASTM D2248; and flexibility by T Bend testing in accordance with ASTM D4145 (where 0T=best; np represents no pick off; and nc represents no cracking.)

Test results are reported below in the following TABLE 1.

TABLE 1

| Conductive Primer | Flexible Top Coat | Salt Spray Corrosion Resistance | Detergent Resistance | Flexibility |
| --- | --- | --- | --- | --- |
| Example A | Example 1 | 1.5 mm total scribe creepage | No blisters | 2T np 3T nc |
| Example B | Example 1 | 3.0 mm total scribe creepage | Few #8 blisters | 3T np/nc |
| Example A | Example 2 | 0.5 mm total scribe creepage | No blisters | 3T np/nc |
| Example B | Example 2 | 0.5 mm total scribe creepage | Medium #8 blisters | 2T np/nc |
| Not applicable | Example 3 (comparative) | 2 mm total scribe creepage | <few #8 blisters | 4T np/nc |

The data presented in Table 1 illustrate that the two coat process of the present invention provides flexibility properties, 2T np and 1T nc better than the comparative prepaint control system applied by conventional processes. The two coat systems of the present invention using Example A as the primer and Examples 1 and 2 as the flexible topcoats provides better detergent and salt spray performance than Example 3, the comparative prepaint system applied by conventional processes.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. A method for forming a coating on a pre-sheared, electroconductive, flat blank having two major surfaces and sheared edges, said method comprising the following steps:
   (1) conveying the blank to an electrodeposition bath located on a coating line;
   (2) applying an aqueous electrodepositable coating composition to both major surfaces and the sheared edges of the blank as the blank passes through the electrodeposition bath,
       the blank serving as an electrode in an electrical circuit comprising the electrode and a counter-electrode immersed in the aqueous electrodepositable coating composition, the composition being deposited onto both major surfaces and the sheared edges of the blank as a substantially continuous coating as electric current is passed between the electrodes;

(3) conveying the coated blank of step (2) from the electrodeposition bath to a drying station located on the coating line; and (4) drying the electrodeposited coating as it passes through the drying station, wherein the electrodeposited coating is a post-formable coating having a T-bend rating of 0T to 6T; and (5) forming the coated blank.

2. The method of claim 1, further comprising, prior to step (5), conveying the coated blank of step (4) to a coating station located on the coating line; applying a second non-electrophoretic coating composition to at least one major surface of the blank as it passes through the coating station to form a continuous coating thereon; conveying the coated blank from the coating station to a second drying station located on the coating line; and drying the coating as it passes through the second drying station.

3. The method of claim 2, wherein the coating station comprises a powder coating booth and the non-electrophoretic coating composition is a powder coating composition.

4. The method of claim 2, wherein the coating station is a spray booth and the second non-electrophoretic coating composition is a liquid coating composition.

5. The method of claim 2, wherein the coating station is a roll-coating station and the non-electrophoretic coating composition is a liquid coating composition.

6. The method of claim 1, wherein the electrodepositable coating composition is capable of being deposited on a cathode.

7. The method of claim 1, wherein the electrodepositable coating composition is capable of being deposited on an anode.

8. The method of claim 1, wherein the blank is contacted with a pretreatment composition prior to step (1).

9. The method of claim 8, wherein the pretreatment composition comprises a zinc phosphate coating composition.

10. A method for forming and coating metal blanks comprising the following steps:

(1) supplying a continuous metal strip from a coil through an entrance of a shear located prior to an entrance end of an electrodeposition bath located on a coating line;

(2) shearing the metal strip to form a flat blank having two major surfaces and sheared edges as the metal strip passes through the shear;

(3) conveying the blank formed in step (2) to the electrodeposition bath;

(4) applying an electrodepositable coating composition to the blank as it passes through the bath,
the blank serving as an electrode in an electrical circuit comprising the electrode and a counter-electrode immersed in the aqueous electrodepositable coating composition, the composition being deposited onto both major surfaces and the sheared edges of the blank as a substantially continuous coating as electric current is passed between the electrodes;

(5) conveying the coated blank of step (4) to a drying station located on the coating line;

(6) drying the coated blank as it passes through the drying station, wherein the electrodeposited coating is a post-formable coating having a T-bend rating of less than 6T; and (7) forming the coated blank.

11. The method of claim 10, wherein the metal strip is contacted with a pretreatment composition prior to step (1).

12. The method of claim 11, wherein the pretreatment composition comprises a zinc phosphate composition.

13. The method of claim 10, wherein the blank of step (2) is contacted with a pretreatment composition prior to step (3).

14. The method of claim 13, wherein the pretreatment composition comprises a zinc phosphate composition.

15. The method of claim 10, wherein the electrodepositable coating composition comprises:

(a) an active hydrogen group-containing electrodepositable ionic resin, and (b) a curing agent having functional groups reactive with the active hydrogens of the ionic resin.

16. The method of claim 15, wherein the electrodepositable ionic resin (a) is electrodepositable on a cathode.

17. The method of claim 16, wherein the ionic resin (a) comprises cationic onium salt groups.

18. The method of claim 16, wherein the ionic resin (a) comprises cationic amine salt groups.

19. The method of claim 15, wherein the electrodepositable ionic resin (a) is electrodepositable on an anode.

20. The method of claim 19, wherein the electrodepositable ionic resin comprises anionic acid salt groups.

21. The method of claim 10, further comprising, prior to step (7), conveying the coated blank of step (6) to a coating station located on the coating line; applying a second, non-electrophoretic coating composition to at least one major surface of the blank as it passes through the coating station to form a continuous coating thereon; conveying the coated blank from the coating station to a second drying station located on the coating line; and drying the coating as it passes through the second drying station.

22. The method of claim 21, wherein the coating station comprises a powder coating booth and the non-electrophoretic coating composition is a powder coating composition.

23. The method of claim 21, wherein the coating station is a spray booth and the second non-electrophoretic coating composition is a liquid coating composition.

24. The method of claim 21, wherein the coating station is a roll-coating station and the non-electrophoretic coating composition is a liquid coating composition.

* * * * *